Oct. 27, 1970  F. PARKER  3,536,929
POWER GENERATING SYSTEM
Filed Dec. 28, 1967  17 Sheets-Sheet 1
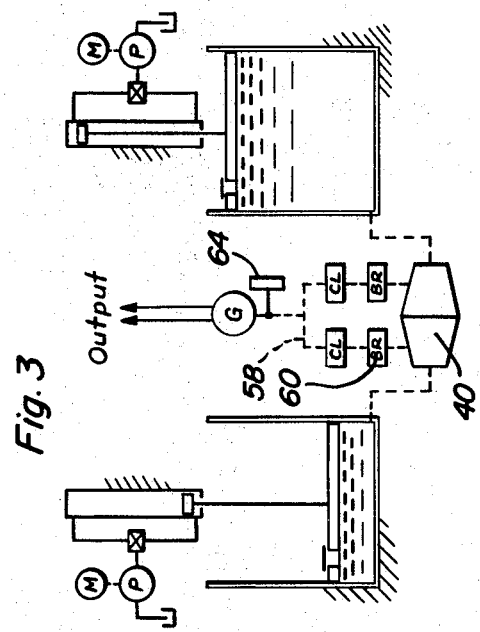
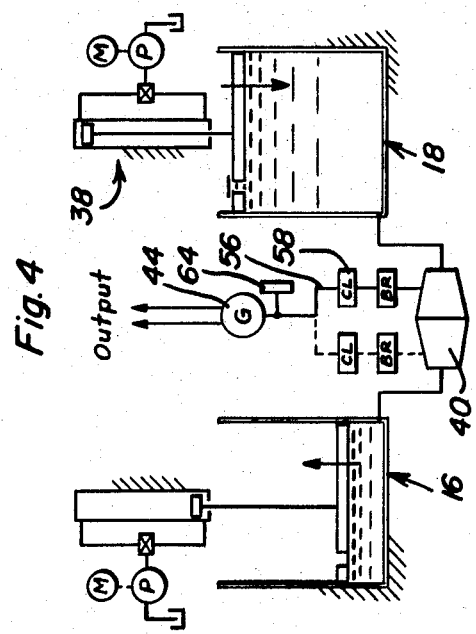
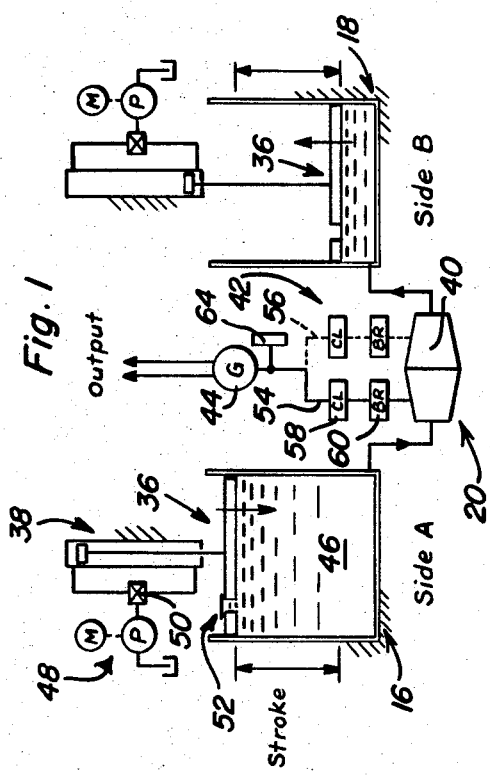
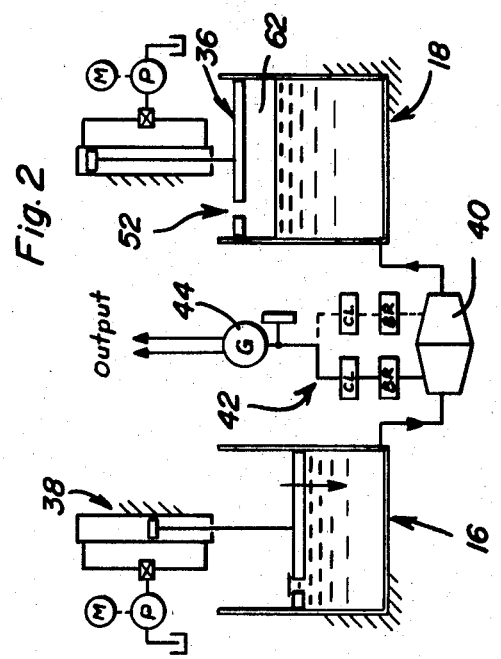
Fred Parker
INVENTOR.

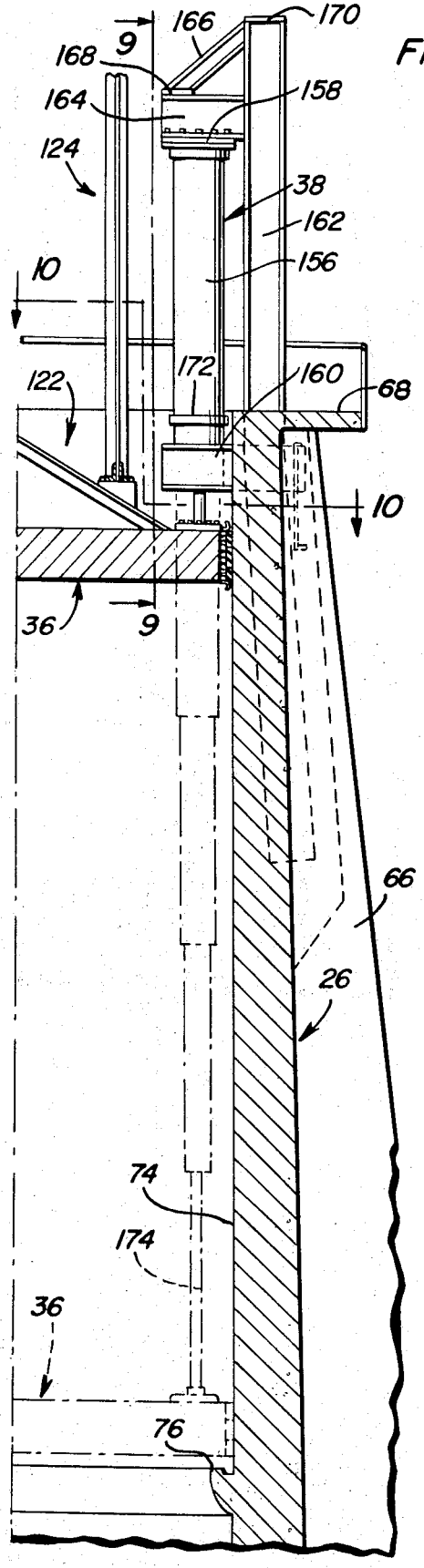
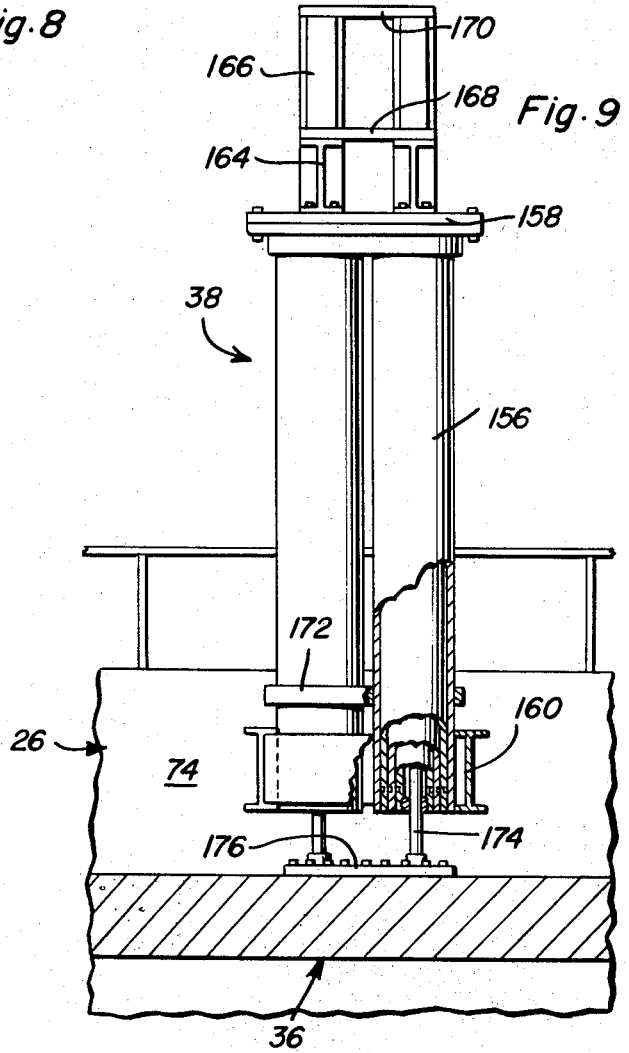
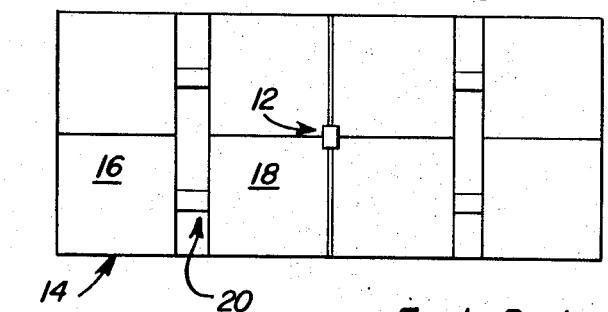

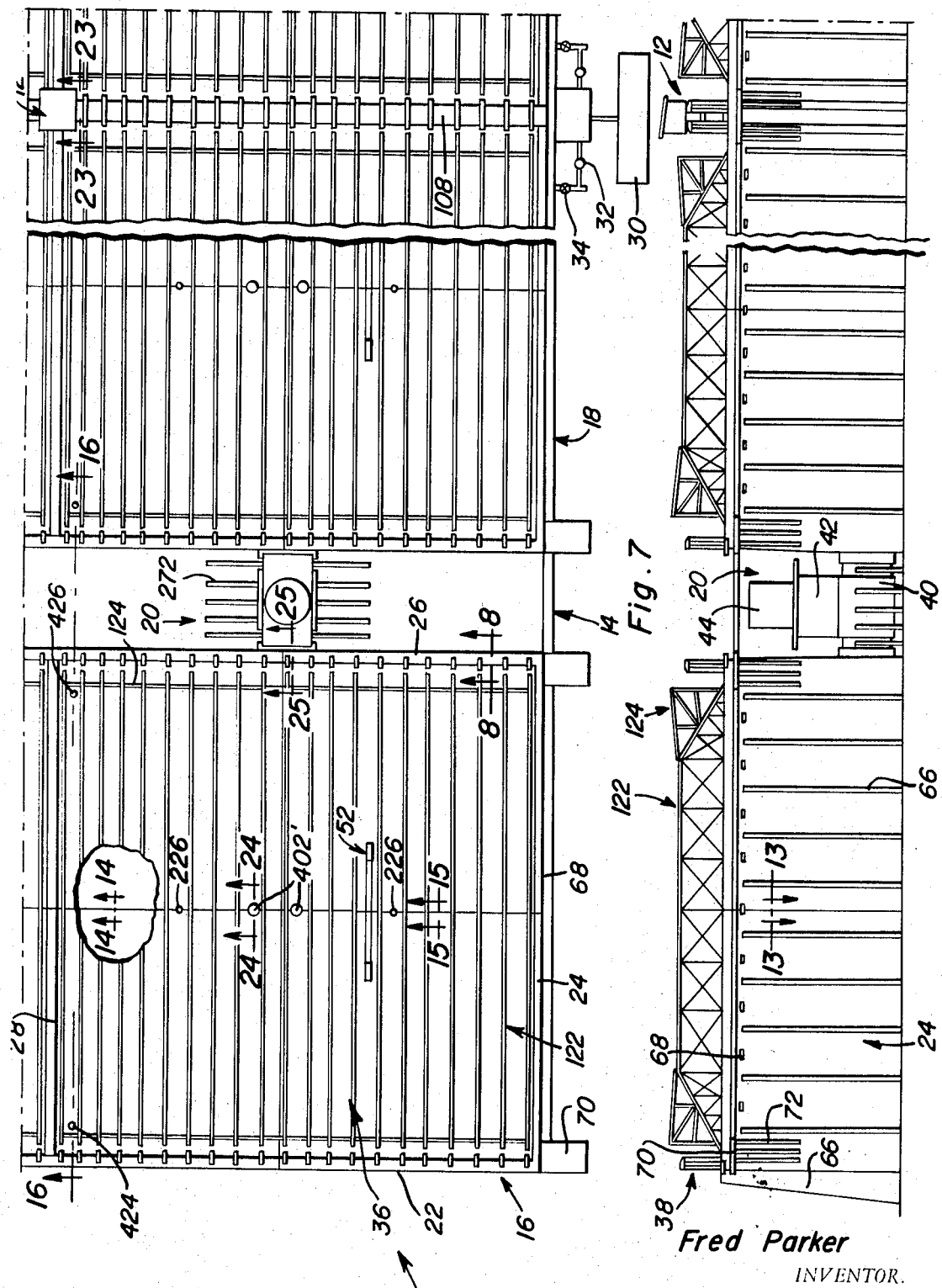

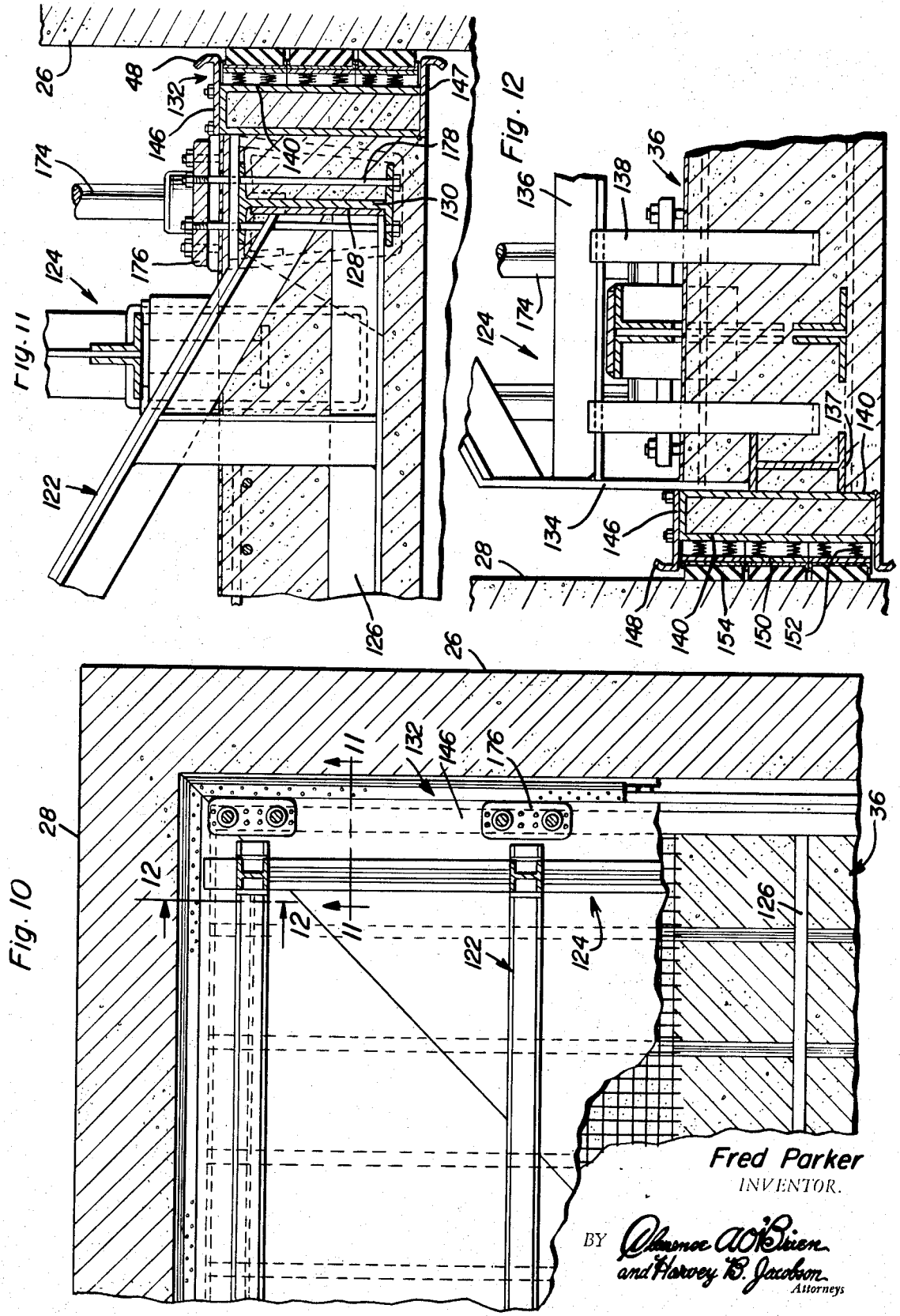

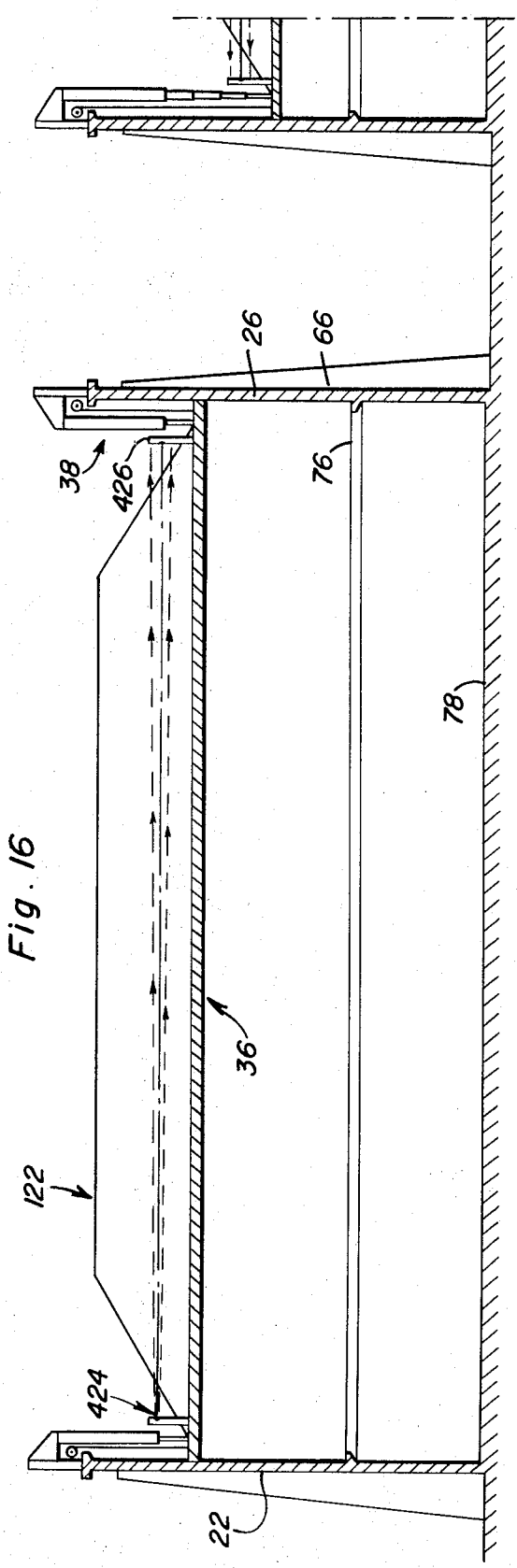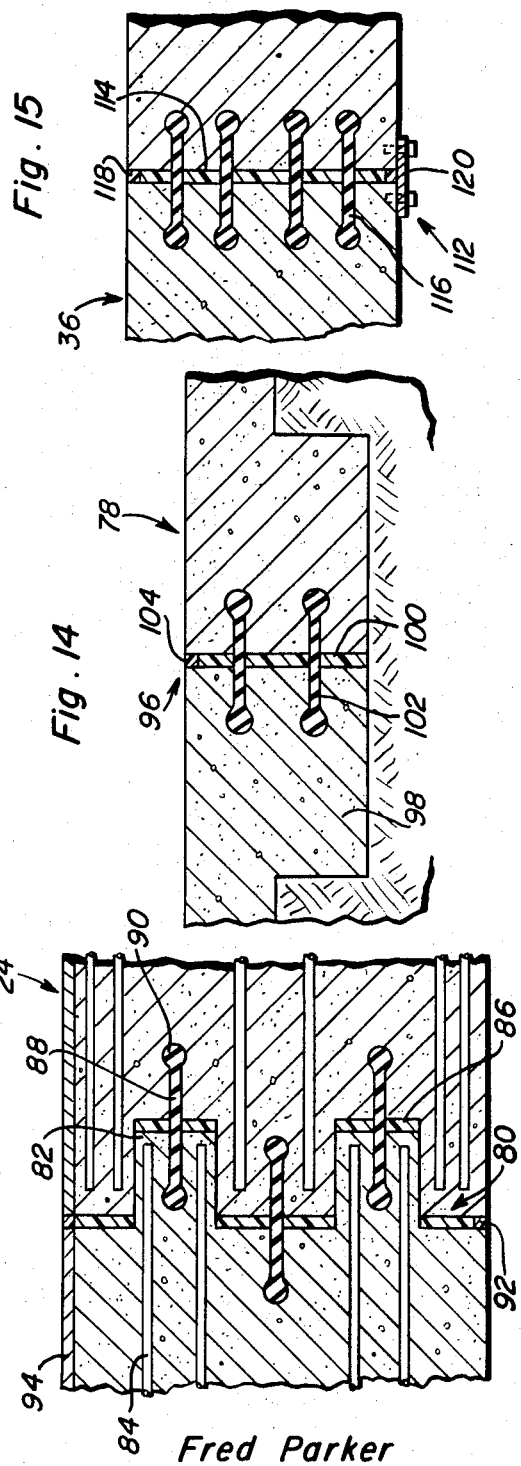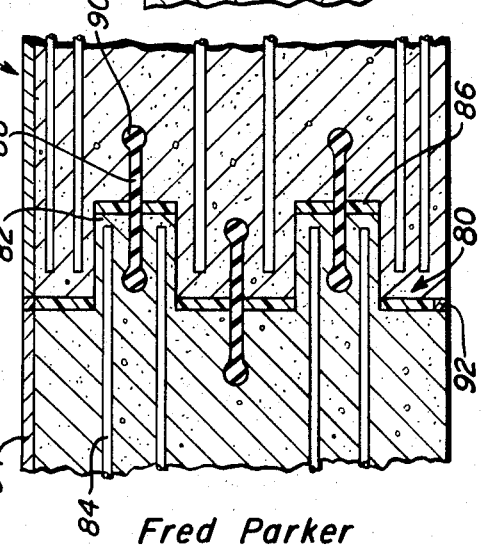

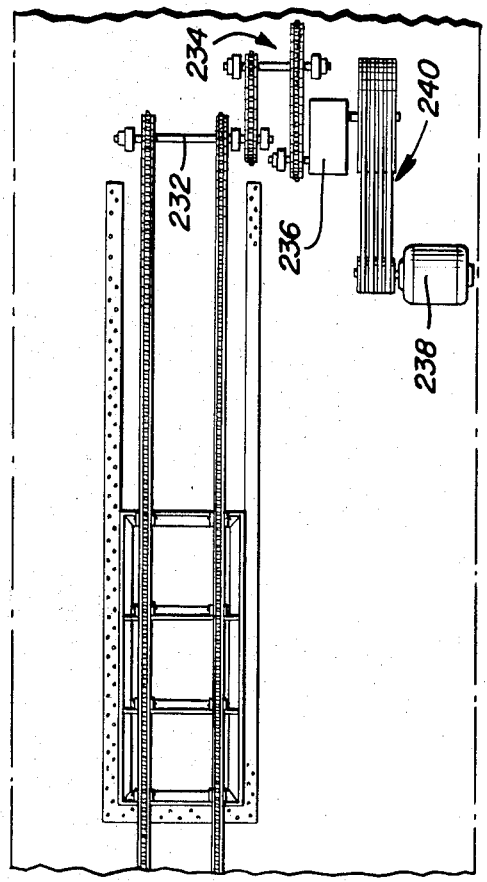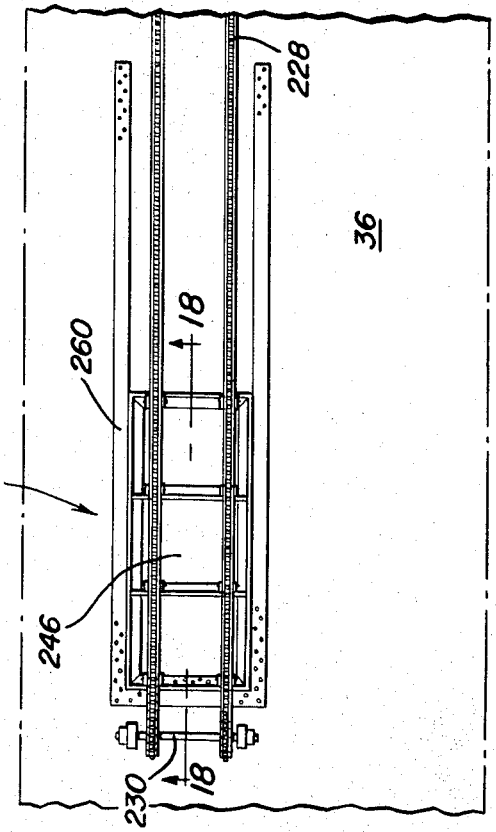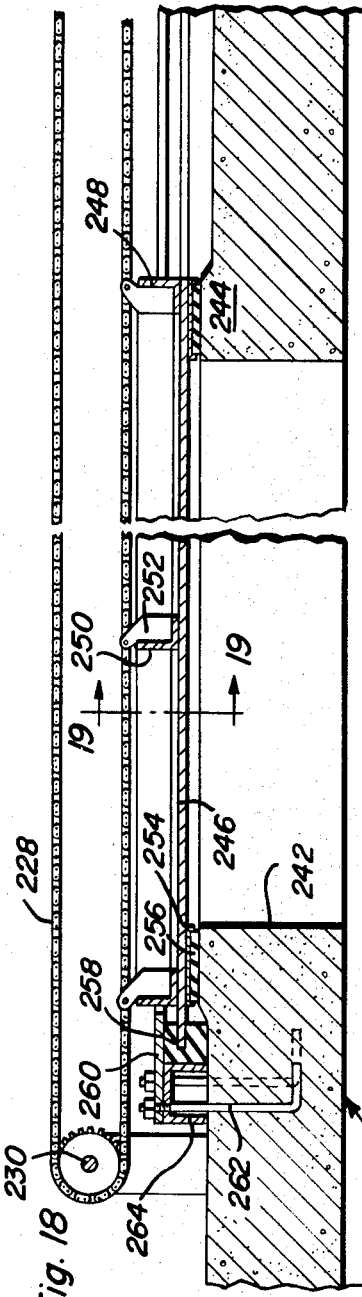

Oct. 27, 1970     F. PARKER     3,536,929
POWER GENERATING SYSTEM
Filed Dec. 28, 1967     17 Sheets-Sheet 7
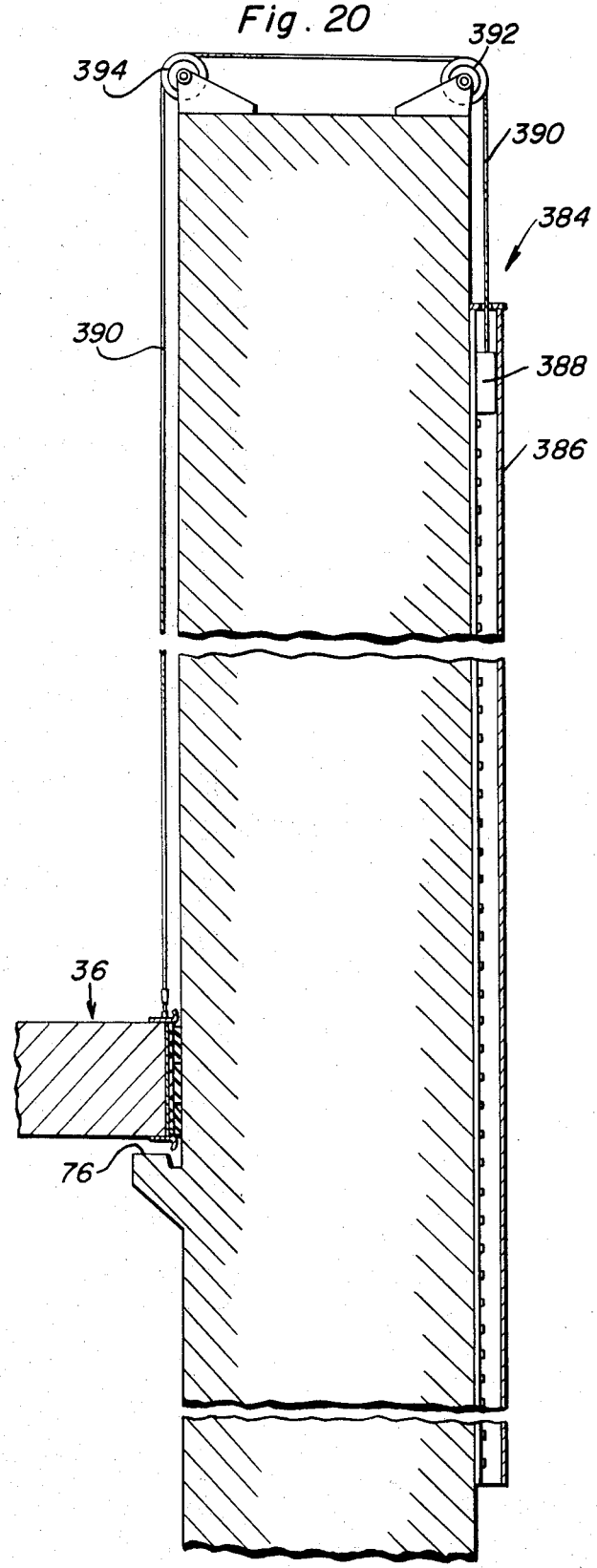
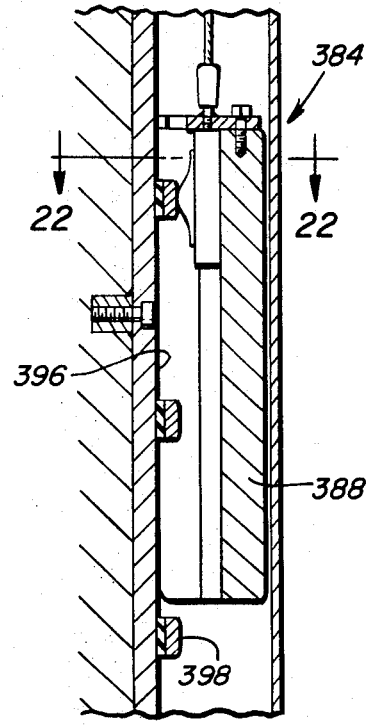
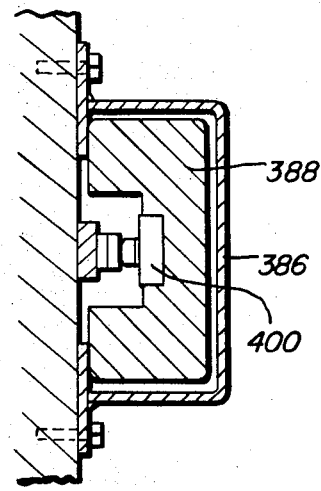
Fred Parker
INVENTOR.
BY *Clarence A. O'Brien*
*and Harvey B. Jacobson*
Attorneys Oct. 27, 1970
F. PARKER
3,536,929
POWER GENERATING SYSTEM
Filed Dec. 28, 1967
17 Sheets-Sheet 8
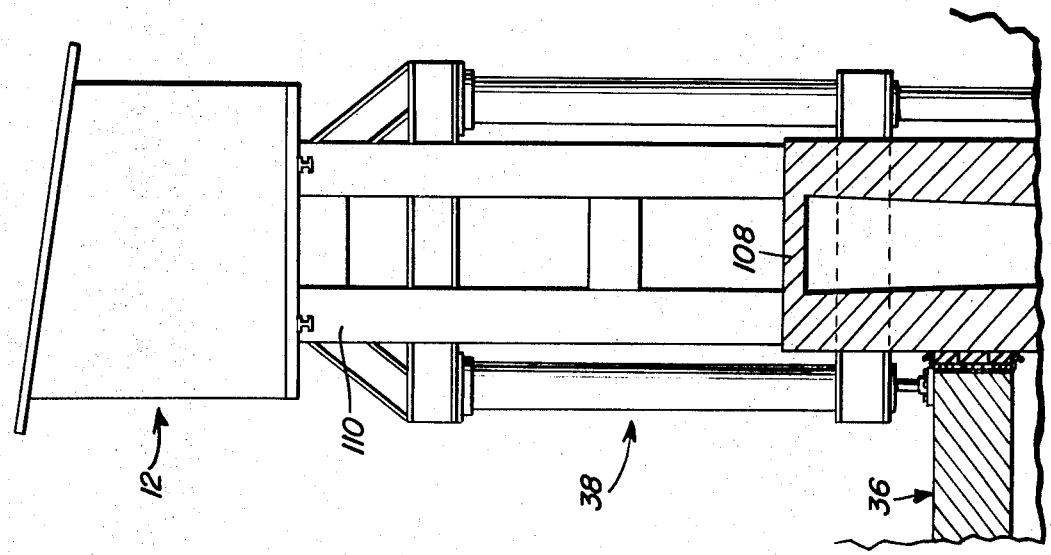
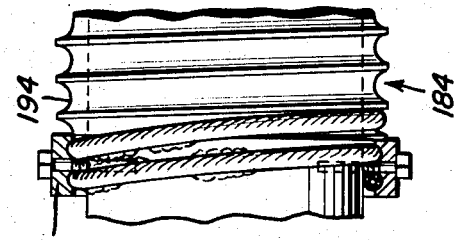
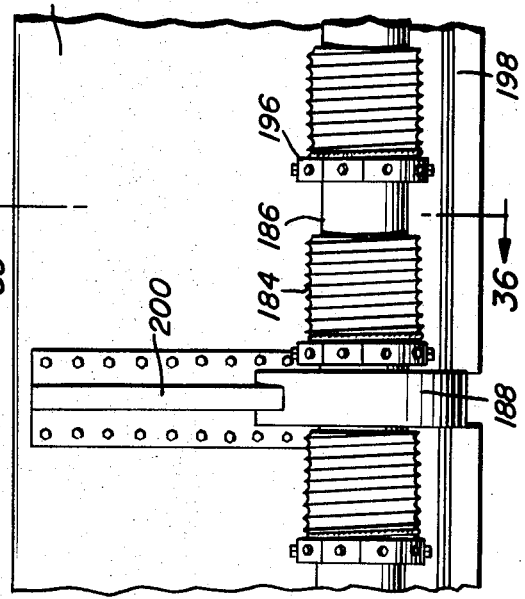
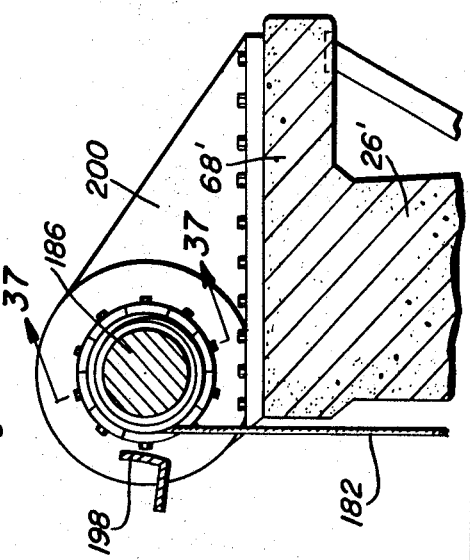
Fred Parker
INVENTOR.
BY *Clarence A. O'Brien*
*and Harvey B. Jacobson*
Attorneys

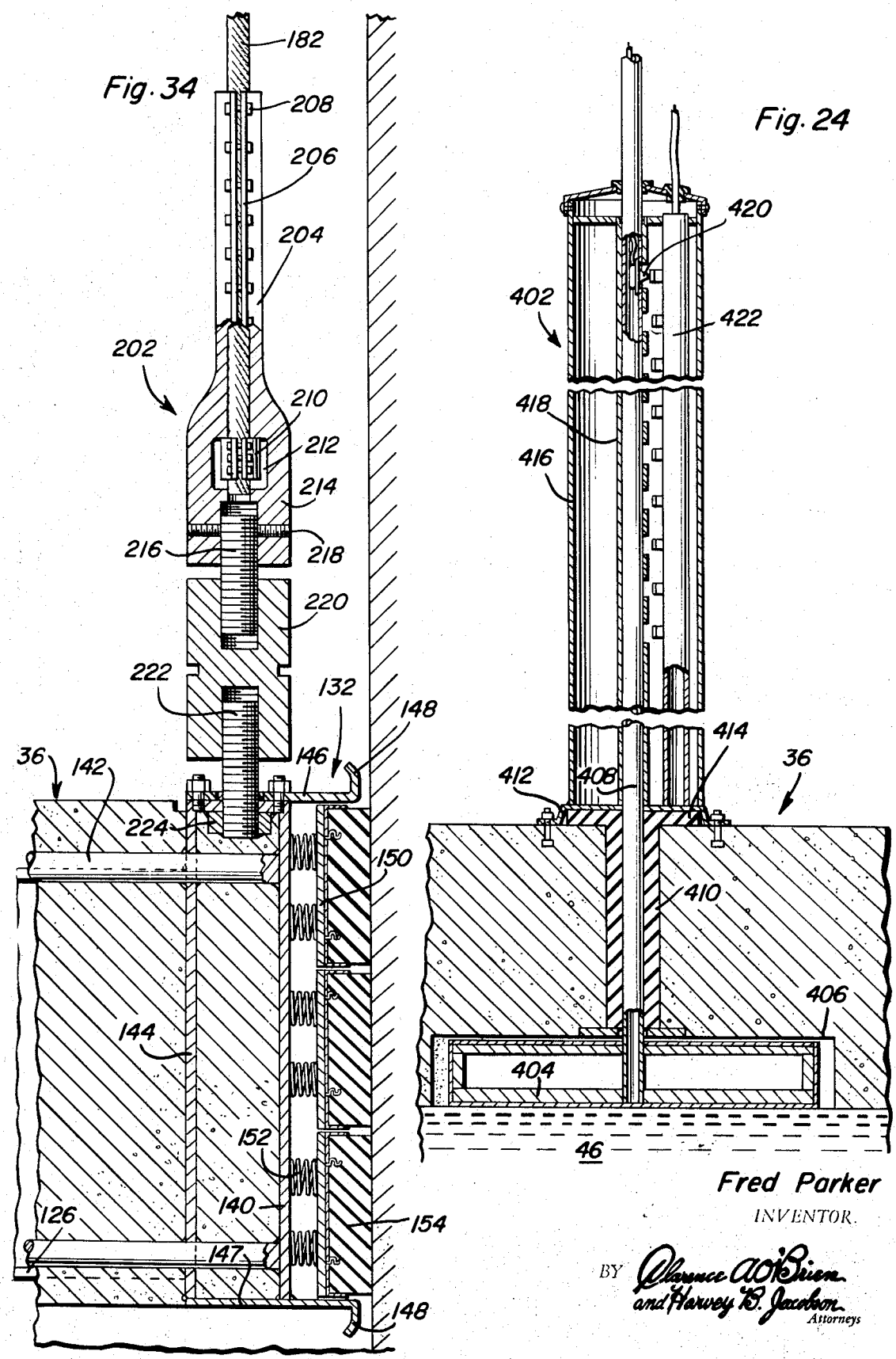

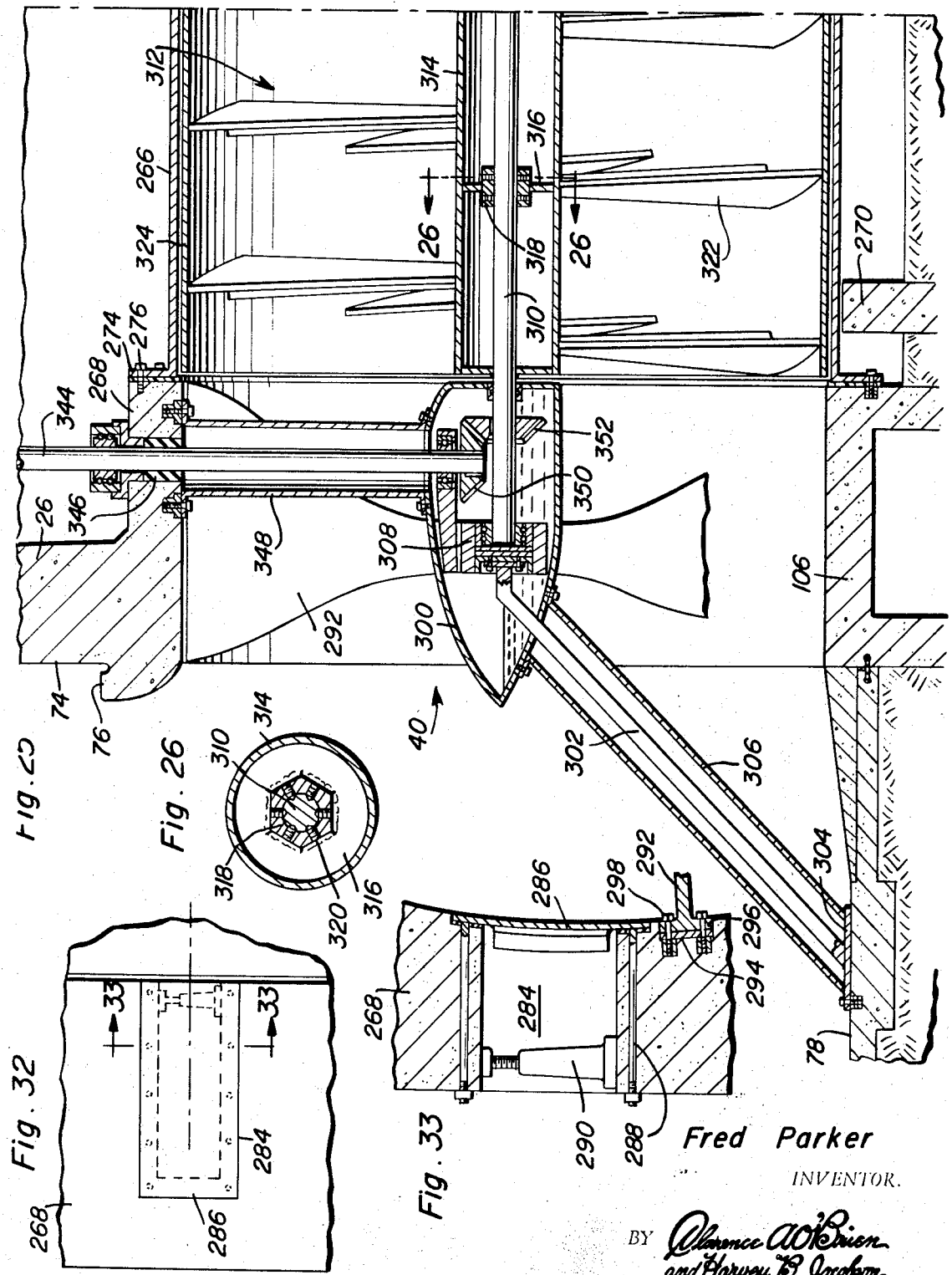

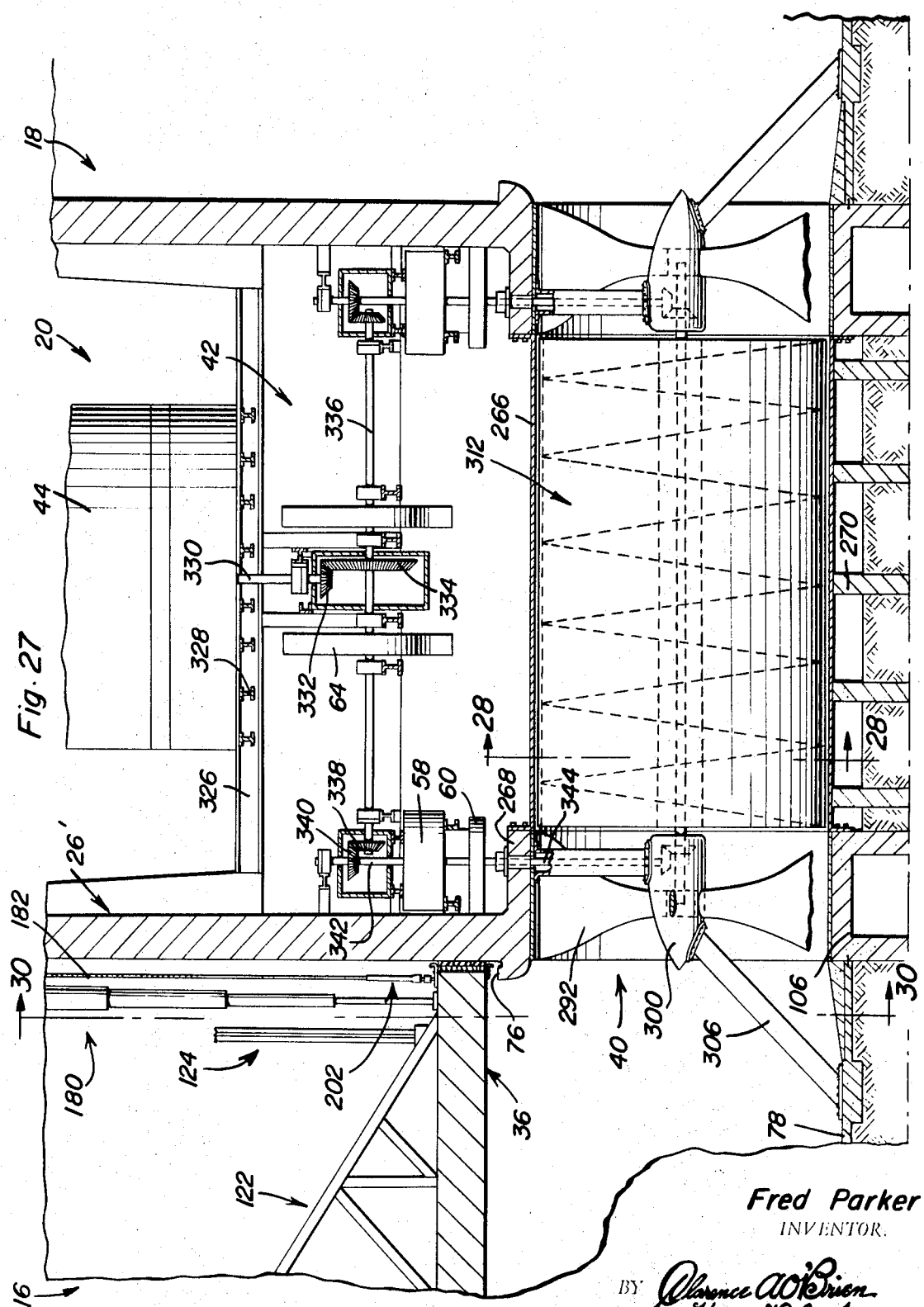

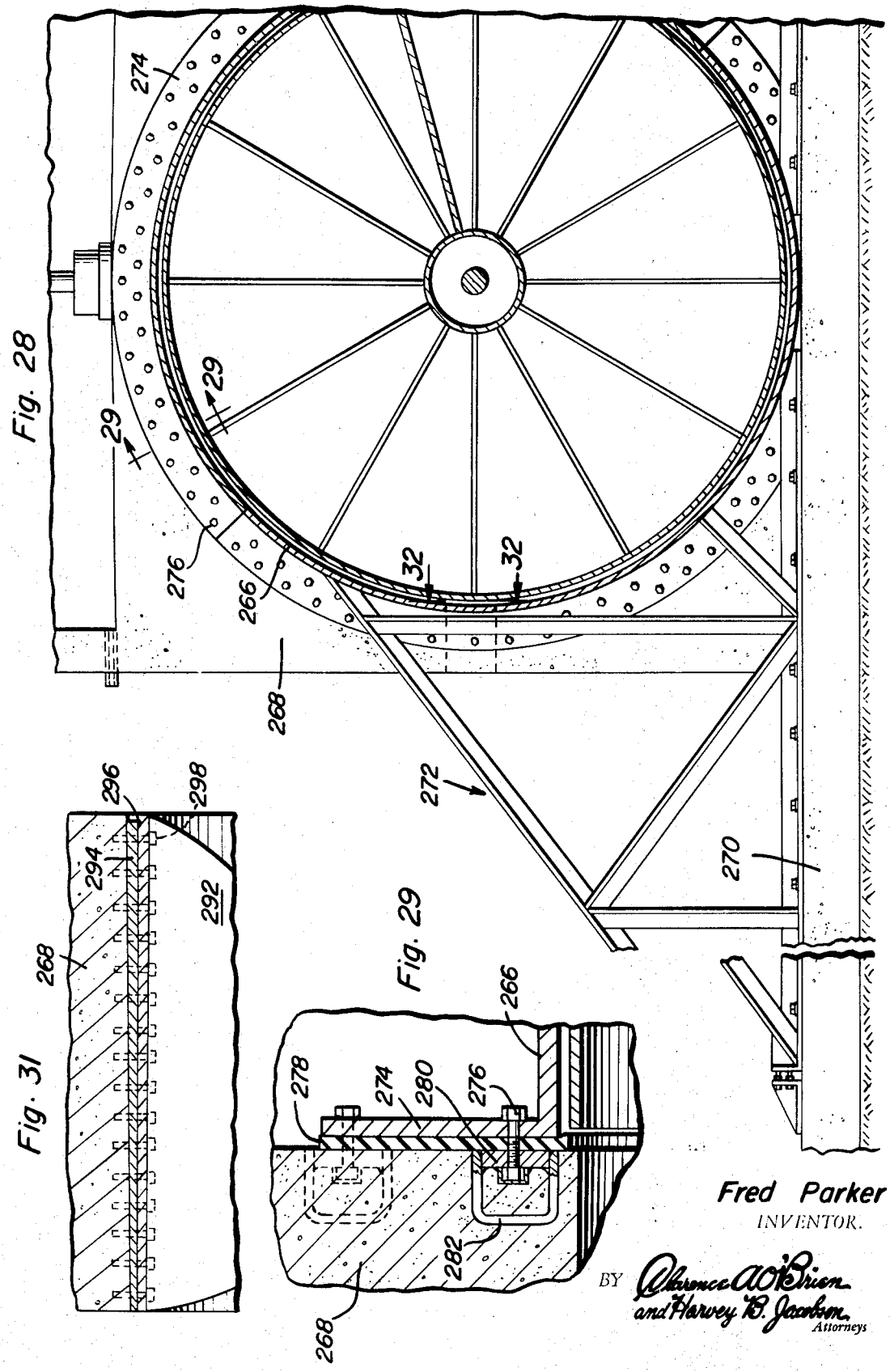

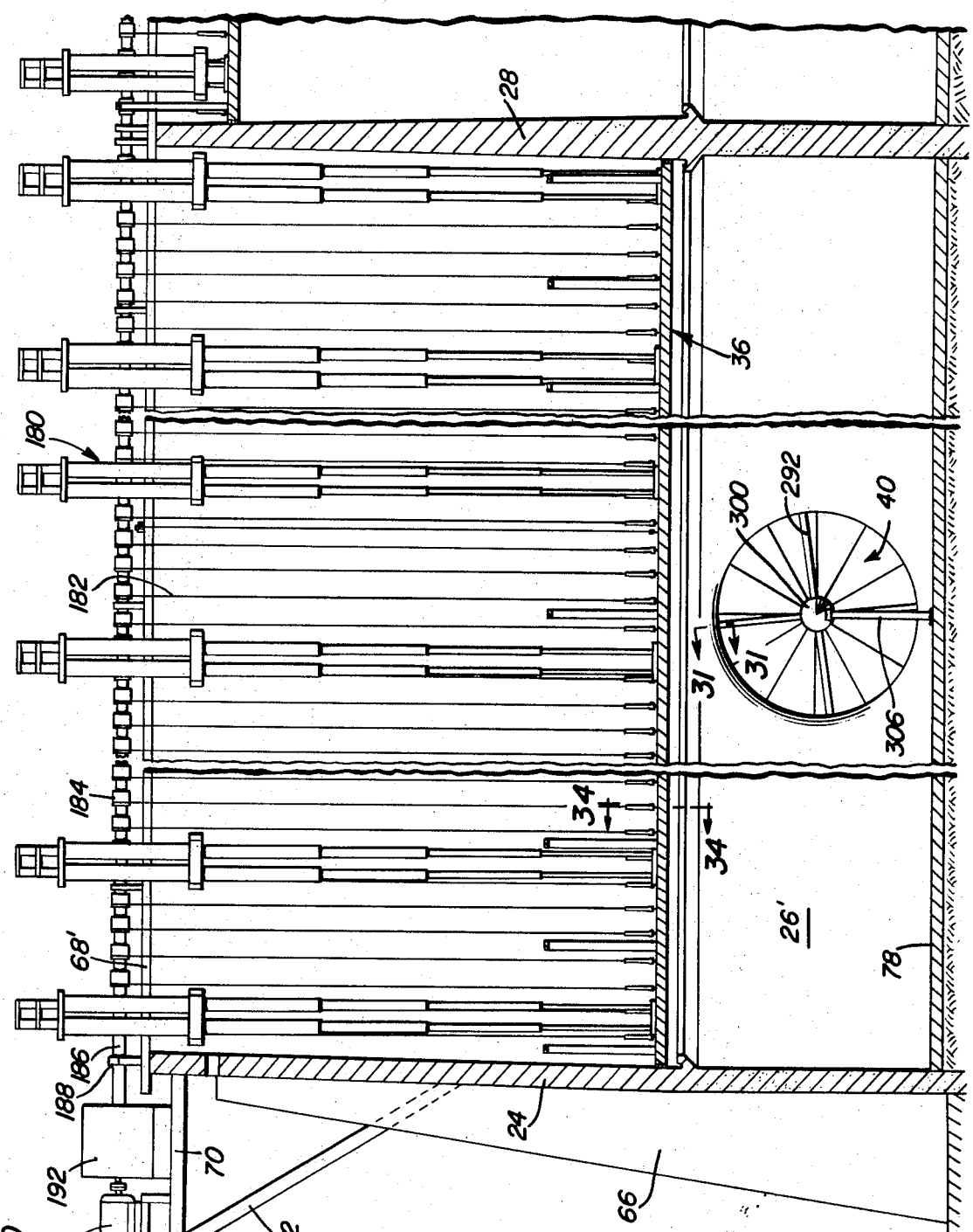

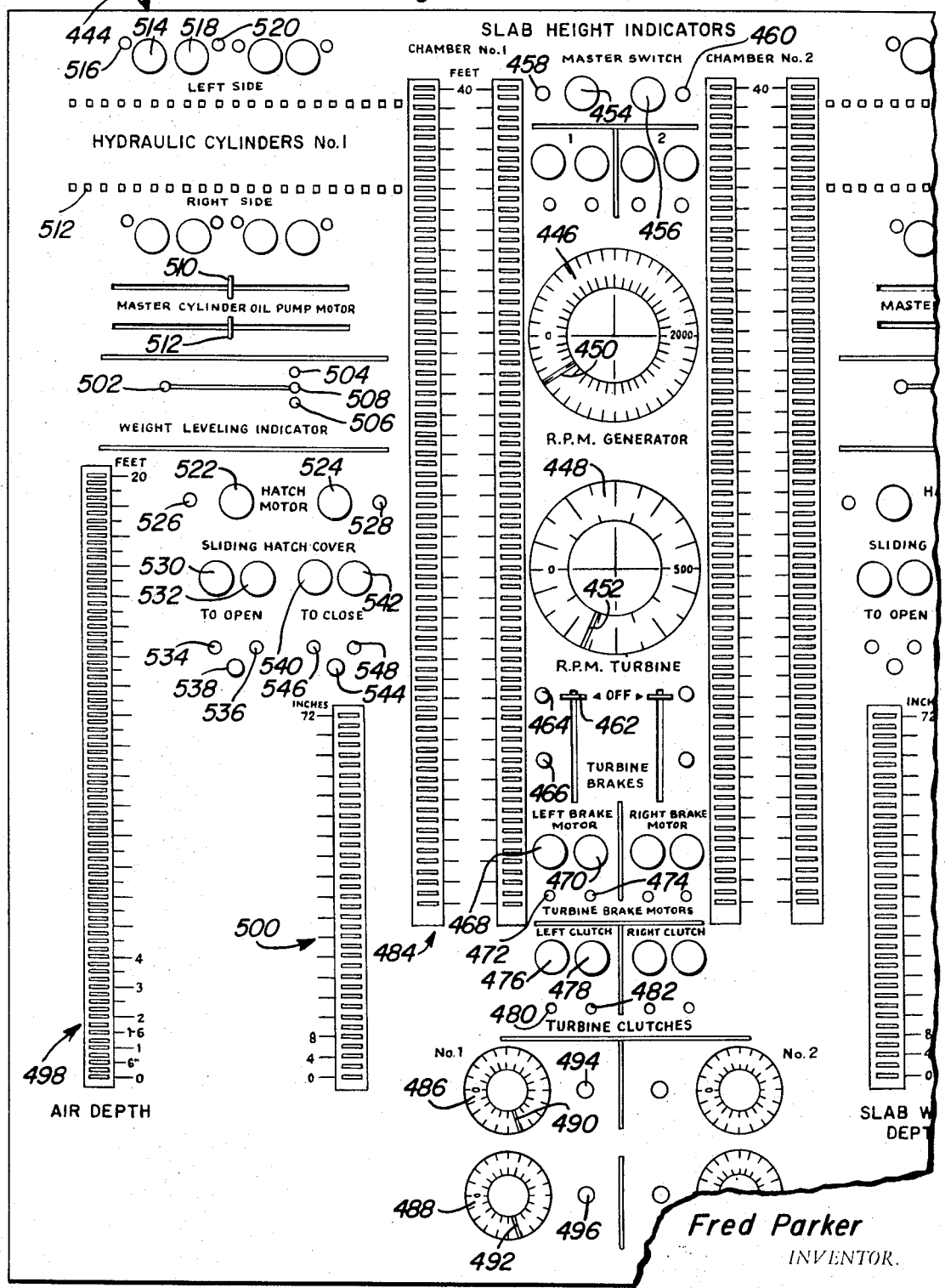

Oct. 27, 1970    F. PARKER    3,536,929
POWER GENERATING SYSTEM
Filed Dec. 28, 1967    17 Sheets-Sheet 15

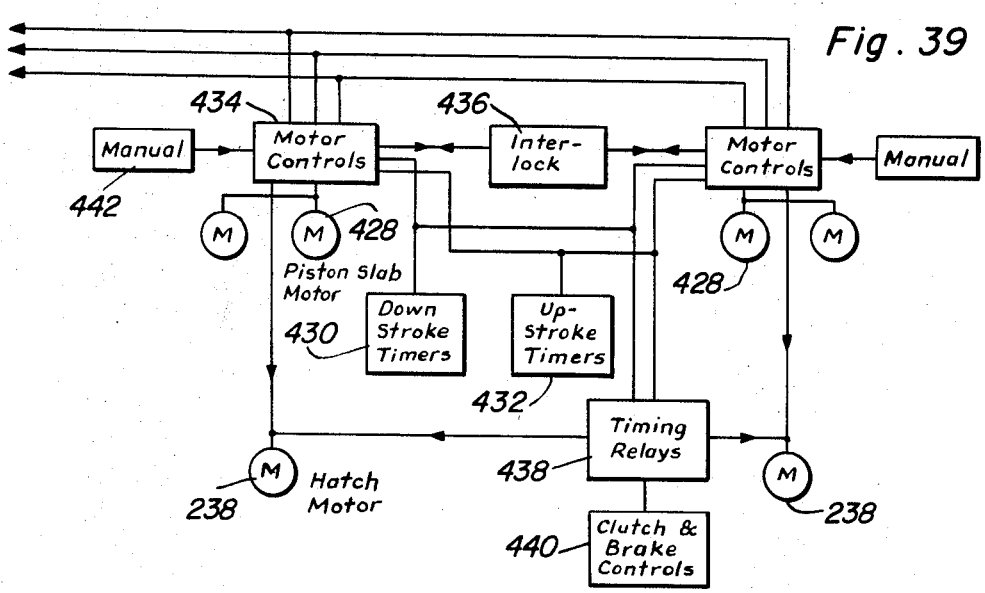

TIMING CHART (single turbine)
Time from start of cycle (sec.)

| Motor | | | 9.33 | 36 | 65 | 68 | 68.25 | 74.33 | 75.5 | 76 | 85.33 | 112 | 141 | 144 | 144.25 | 150.3 | 151.5 | 152 |
|---|---|---|---|---|---|---|---|---|---|---|---|---|---|---|---|---|---|---|
| Piston Slab | Side A | Down | X | X | X | X | | | | | | | | | | | | |
| | | Up | | | | | | | | X | X | X | X | X | | | | |
| | Side B | Down | | | | | | | X | X | X | X | | X | | | | |
| | | Up | X | X | | | | | | | | | | | | | | |
| Hatch | Side A | Open | | | | | | X | X | | | | | | | | | |
| | | Close | | | | | | | | | | | | | X | X | X | |
| | Side B | Open | X | | | | | | | | | | | | | | | |
| | | Close | | | X | X | X | X | X | | | | | | | | | |
| Brake | Side A | Engage | | | | | | | | | X | X | X | X | | | | X |
| | | Diseng | X | X | X | X | X | X | X | X | | | | | X | X | X | |
| | Side B | Engage | | | | | | | X | X | X | | X | | | | | |
| | | Diseng | X | X | X | X | X | X | | | | X | | X | X | X | X | X |
| Clutch | Side A | Engage | X | X | X | X | X | X | X | X | | | | | X | X | X | |
| | | Diseng | | | | | | | | | X | X | X | X | | | | X |
| Clutch | Side B | Engage | X | X | | | | | X | X | X | X | X | X | X | | | X |
| | | Diseng | | | X | X | X | X | | | | | | | | X | X | |

Fred Parker
INVENTOR.

BY *Clarence A. O'Brien*
and *Harvey B. Jacobson*
Attorneys

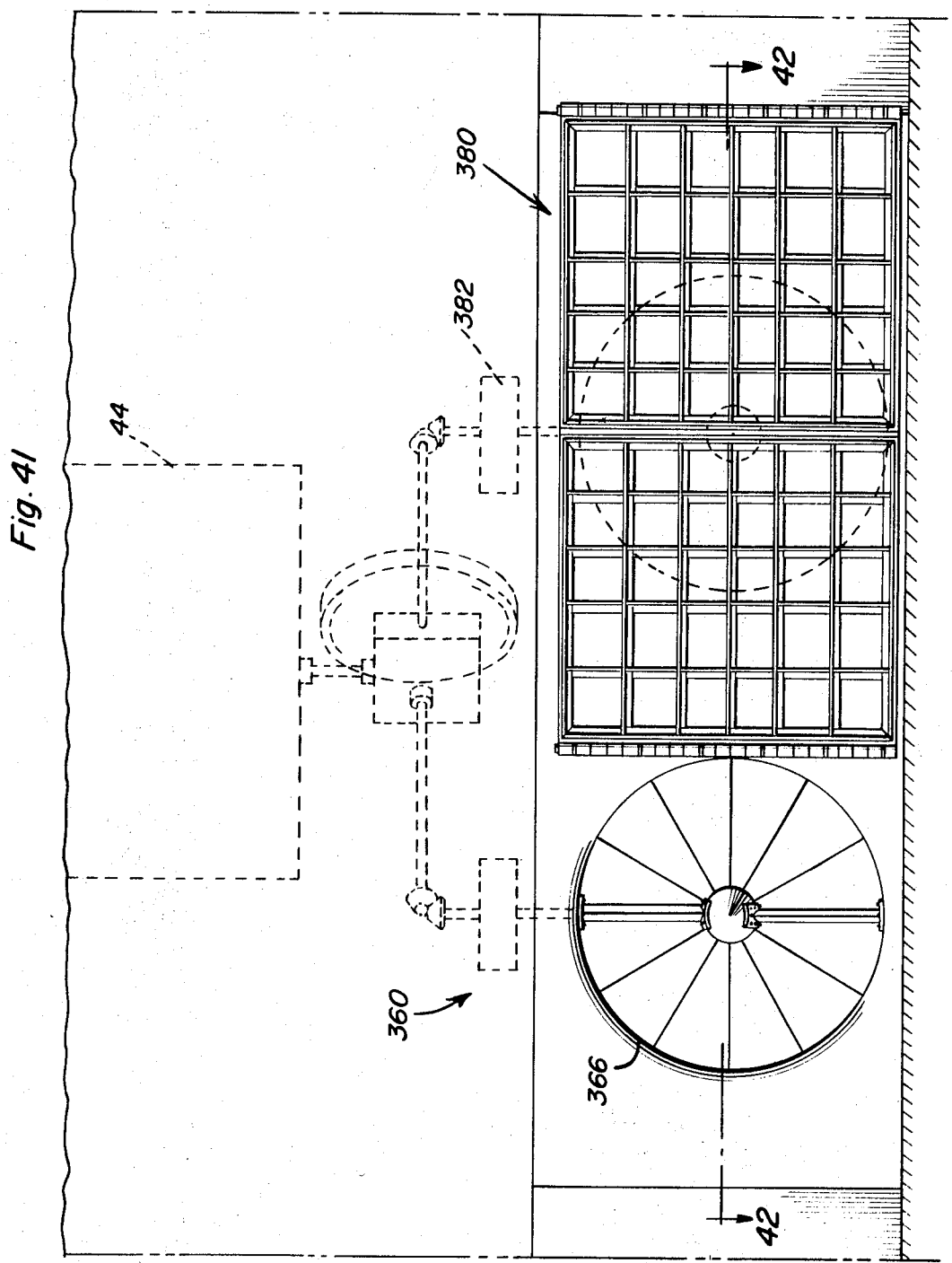

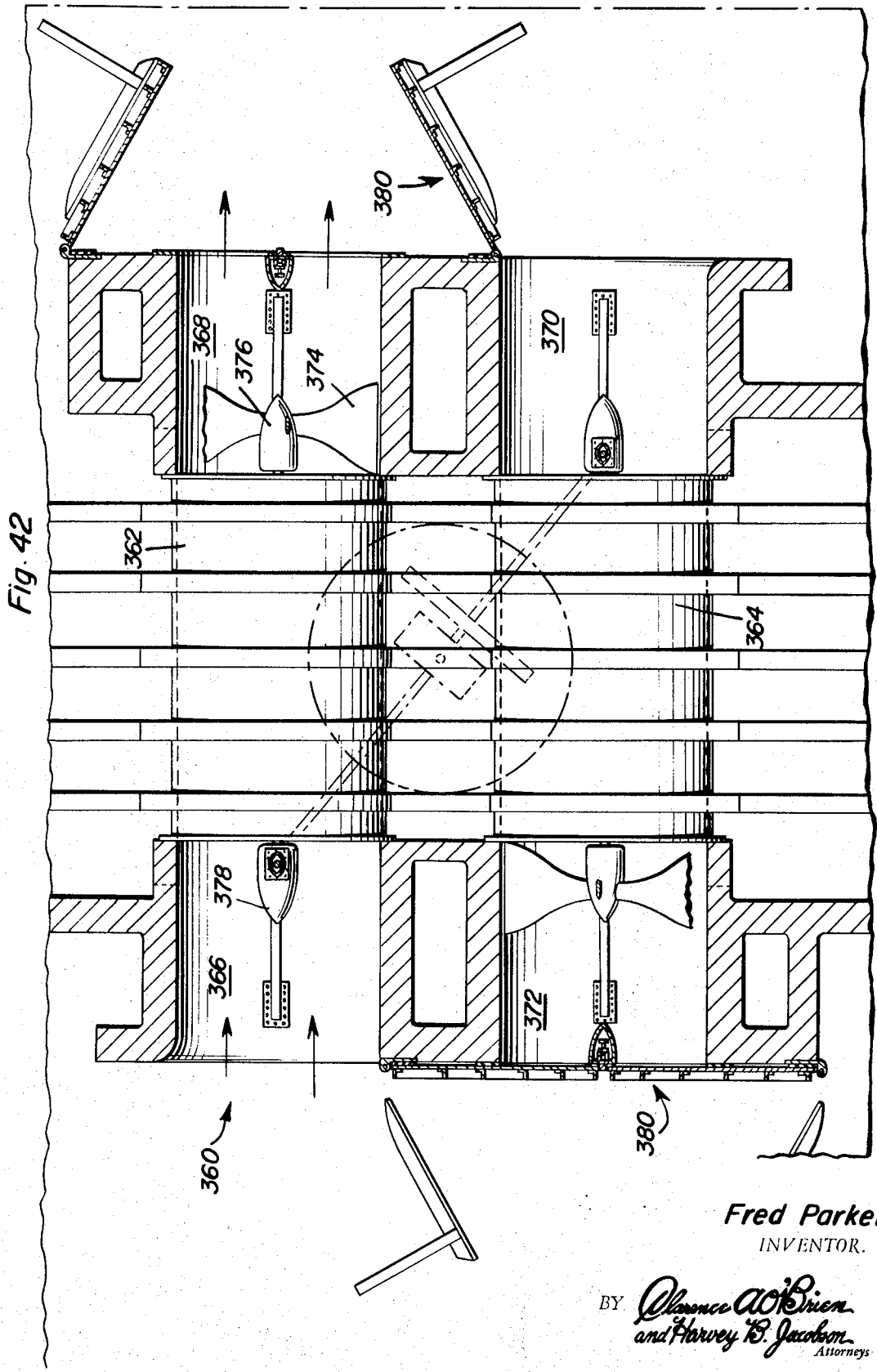

United States Patent Office 3,536,929
Patented Oct. 27, 1970

3,536,929
POWER GENERATING SYSTEM
Fred Parker, 602 Waverly Road,
Tallahassee, Fla. 32303
Filed Dec. 28, 1967, Ser. No. 694,196
Int. Cl. H02k 7/18; F01d 15/10
U.S. Cl. 290—52
18 Claims

ABSTRACT OF THE DISCLOSURE

A system for converting the potential and kinetic energy of a body of water into electrical energy by displacing the water from one reservoir into another through a turbine assembly interconnecting the reservoirs. The water is displaced by reinforced concrete slabs of substantial weight and dimension. Power regulated movement of one slab in an upstroke direction more rapidly than the rise of water is effected while the water is displaced at the proper velocity and pressure through the turbine assembly by the other slab moving in a downstroke direction.

This invention relates to the conversion of energy from one form to another and more particularly to the conversion of mechanical energy into electrical energy involving the displacement of relatively large bodies of water.

In general, gravitationally assisted displacement of water from an enclosure, reservoir or chamber through a turbine thereby operated to run an electrical generator, is known. The generation of electrical energy by such a method has been proposed for example in Pat. No. 3,028,727 to Anston. However, prior proposals of this type have failed to take into account requirements for efficient operation of the turbine. In order to generate any usable quantity of electrical energy, the turbine must be powered by supply of water under requisite velocity and pressure differentials. Toward this end, a substantial quantity of water must be stored and displaced. Accordingly, formidable problems arise in the storage of water, displacement thereof and control over the flow of such water through the turbine. Also, any power generating system of the aforementioned type with which the present invention is concerned, must be capable of coping with special problems involving output power regulation, operational monitoring and control over the operation of various components.

The present invention deals with the foregoing problems which are overcome by a novel arrangement of water storing reservoirs and turbine assemblies and by special, interrelated structural features by virtue of which relative large quantities of water are handled and regulated in order to convert the potential and kinetic energy associated with the bodies of water into electrical energy.

The foregoing objectives are achieved in accordance with the present invention by displacing relatively large quantities of water from one reservoir into another, the water levels within the reservoir being at all times above a reservoir connecting conduit within which a turbine assembly is operatively mounted. Thus, as the water is displaced through the conduit between the reservoirs in opposite directions, a rotational output is obtained from the turbine assembly to drive an electrical generator. The water is displaced between the reservoirs by relatively massive, reinforced concrete slabs operating as vertically displaceable pistons within the reservoirs. In order to regulate the flow velocity and pressure of the water conducted through the turbine assemblies, a plurality of power operated devices are fixedly mounted on top of the reservoir walls and exert displacing forces on the slabs both during a power generating downstroke movement and an upstroke return movement. Also, for proper operation of the turbine assembly, upstroke movement of the slabs is more rapid than the rise of water in its reservoir to obtain the proper pressure differential between the inlet and outlet of the turbine assembly through which water is conducted. Further, the mechanical power connection from the turbine assembly to the generator is temporarily interrupted prior to reversal of flow at the ends of the upstroke and downstroke movement of the water displacing slabs.

For proper operation of the power generating system during upstroke movement of the slabs, the space which develops between the bottom of the slab and the rising body of water within the reservoir must be vented to atmosphere. Motor controlled hatch mechanisms are accordingly provided for this purpose. At the ends of the upstroke and downstroke movement of the slabs, drive of the generator by the turbine is interrupted by hydrodynamic, torque transmitting mechanisms so that a reversal of flow through the turbine assembly may be facilitated.

It will be appreciated from the foregoing, that suitable controls must be provided in order to regulate, program and monitor operation of the power operated devices that exert displacing force on the piston slabs, the motors that control operation of the slab venting hatch devices and the controls for the clutch devices and brake devices when utilized. The power operated devices for the piston slabs may be two-way hydraulic cylinder devices energized by motor operated pumps or may be one-way cylinder devices in combination with motor winch operated cable mechanisms.

Facilities for monitoring and exercising supervisory control over the system are also provided. Thus, means for indicating the instantaneous level of different sides of the piston slabs, the spacing of the slab from the water level and the water level itself are provided and the measurements displayed on a control panel for monitoring purposes. The operators may accordingly manually overrule automatic operation in order to correct and restore the system to proper operation. In view of the dimensional extent of the piston slabs, level sensing means is also provided so that the horizontal condition of the slab may be maintained by corrective control over the power operated devices if needed. In order to avoid operational difficulties resulting from the dimensional extent of the piston slabs, the slabs are made in accordance with a special structural arrangement. Similarly, special structural features are associated with the reservoirs and the turbine assemblies to minimize leakage and cooperate with the piston slabs for smooth operation of the power generating system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGS. 1 through 4 are diagrammatic views schematically illustrating a basic unit of a power generating system in different operational phases.

FIG. 5 is a diagrammatic top plan view illustrating a typical layout for a power plant constructed in accordance with the present invention.

FIG. 6 is a partial top plan view of the power plant diagrammatically shown in FIG. 5.

FIG. 7 is a partial front elevational view of the power plant shown in FIG. 6.

FIG. 8 is an enlarged partial sectional view taken substantially through a plane indicated by section line 8—8 in FIG. 6.

FIG. 9 is an enlarged partial sectional view taken substantially through a plane indicated by section line 9—9 in FIG. 8.

FIG. 10 is an enlarged partial sectional view taken substantially through a plane indicated by section line 10—10 in FIG. 8.

FIG. 11 is an enlarged partial sectional view taken substantially through a plane indicated by section line 11—11 in FIG. 10.

FIG. 12 is an enlarged partial sectional view taken substantially through a plane indicated by section line 12—12 in FIG. 10.

FIG. 13 is an enlarged partial sectional view taken substantially through a plane indicated by section line 13—13 in FIG. 7.

FIG. 14 is an enlarged partial sectional view taken substantially through a plane indicated by section line 14—14 in FIG. 6.

FIG. 15 is an enlarged partial sectional view taken substantially through a plane indicated by section line 15—15 in FIG. 6.

FIG. 16 is an enlarged partial sectional view taken substantially through a plane indicated by section line 16—16 in FIG. 6 showing the slab level sensing devices.

FIG. 17 is an enlarged partial top plan view of a portion of the slab showing the vent hatch mechanism associated with the piston slab.

FIG. 18 is an enlarged partial sectional view taken substantially through a plane indicated by section line 18—18 in FIG. 17.

FIG. 19 is an enlarged transverse sectional view taken substantially through a plane indicated by section line 19—19 in FIG. 18.

FIG. 20 is an enlarged partial sectional view through a portion of the reservoir wall structure of the power plant illustrating the slab level indicating mechanism.

FIG. 21 is an enlarged partial sectional view of a portion of the level indicating mechanism shown in FIG. 20.

FIG. 22 is a transverse sectional view taken substantially through a plane indicated by section line 22—22 in FIG. 21.

FIG. 23 is an enlarged partial sectional view taken substantially through a plane indicated by section line 23—23 in FIG. 6 showing the control station for the power plant.

FIG. 24 is an enlarged partial sectional view taken substantially through a plane indicated by section line 24—24 in FIG. 6 showing the air depth measuring mechanism associated with the piston slab.

FIG. 25 is an enlarged partial sectional view taken substantially through a plane indicated by section line 25—25 in FIG. 6 showing a portion of the turbine assembly structure.

FIG. 26 is a partial transverse sectional view taken substantially through a plane indicated by section line 26—26 in FIG. 25.

FIG. 27 is a partial side sectional view through the turbine assembly associated with a modified form of power plant.

FIG. 28 is an enlarged partial sectional view taken substantially through a plane indicated by section line 28—28 in FIG. 27.

FIG. 29 is an enlarged partial sectional view taken substantially through a plane indicated by section line 29—29 in FIG. 28.

FIG. 30 is a sectional view taken substantially through a plane indicated by section line 30—30 in FIG. 27.

FIG. 31 is an enlarged partial sectional view taken substantially through a plane indicated by section line 31—31 in FIG. 30.

FIG. 32 is an enlarged partial sectional view taken substantially through a plane indicated by section line 32—32 in FIG. 28.

FIG. 33 is a sectional view taken substantially through a plane indicated by section line 33—33 in FIG. 32.

FIG. 34 is an enlarged partial sectional view taken substantially through a plane indicated by section line 34—34 in FIG. 30.

FIG. 35 is an enlarged partial top plan view of a portion of the modified form of power plant as shown in FIG. 30.

FIG. 36 is a transverse sectional view taken substantially through a plane indicated by section line 36—36 in FIG. 35.

FIG. 37 is an enlarged partial sectional view taken substantially through a plane indicated by section line 37—37 in FIG. 36.

FIG. 38 is a partial elevational view of the control panel associated with the power plant illustrated in FIGS. 6 through 26.

FIG. 39 is a block diagram illustrating the control system with which the control panel is associated.

FIG. 40 is a timing chart depicting the automatic operational sequence associated with the control system for the power plant illustrated in FIGS. 6 through 26.

FIG. 41 is a partial front elevational view showing a modified form of turbine assembly associated with a power plant constructed in accordance with the invention.

FIG. 42 is a top sectional view taken substantially through a plane indicated by section line 42—42 in FIG. 41.

GENERAL ARRANGEMENT AND OPERATION

Referring initially to FIG. 5, the layout of a typical power generating plant constructed in accordance with the present invention is diagrammatically illustrated in top plan view. The power plant generally referred to by reference numeral 10 consists of four operational units under control of a central control station 12, each operational unit generally designated by reference numeral 14 being similar in construction and operation. Each operational unit 14 consists of two sides 16 and 18 of similar construction which are interconnected by a turbine-generator assembly 20 in order to produce an electrical output. In the illustrated embodiment, four operational units 14 are structurally interconnected so that power from the four associated turbine-generator assemblies may be distributed through a distribution station near the power plant. It will be appreciated however that any number of operational units could make up a power plant whether it be a single operational unit or a plurality thereof. For purposes of describing the invention therefore, a single operational unit consisting of the two sides 16 and 18 and the interconnecting turbine-generator assembly 20 need be considered. Further, since the two sides 16 and 18 are similar in construction, unless otherwise indicated it should be assumed hereafter that any structural features described in connection with one side also applies to the other side of the operational unit.

Referring now to FIGS. 6 and 7, it will be observed that each of the sides 16 and 18 associated with an operational unit 14 is generally rectangular in top plan view and encloses a reservoir between three external, vertical walls 22, 24 and 26 and a vertical connecting wall 28. Water may be supplied to each of the reservoirs in each operational unit from a water storage facility 30 or other sources of water through underground pipes. Check valves 32 and gate valves 34 between the water storage facility and the reservoirs are accordingly provided as diagrammatically illustrated in FIG. 6. In this manner, a predetermined quantity of water may be maintained in each operational unit.

Each side 16 and 18 of the operational unit in addition to the reservoir enclosing a body of water, also includes a horizontal piston slab assembly generally referred to by reference numeral 36 in FIG. 6. The piston slab assembly is vertically movable between the walls 22, 24, 26 and 28 of the reservoir with which it is in wiping engagement so as to displace the body of water downwardly out of the reservoir. In order to effect vertical displacement of the piston slab assembly at the proper rate of movement a plurality of equally spaced, power operated devices 38 are mounted on the reservoir walls 22 and 26 adjacent opposite peripheral sides of the rectangular piston slab assembly 36. Thus, a predetermined body of water is displaced from one reservoir to the other in order to operate the turbine-generator assembly 20 by causing the water to pass through the turbine generally denoted by reference numeral 40 in FIG. 7. Operation of the turbine and regulation of its output is controlled by a drive assembly 42 which operatively connects the turbine to electric generator 44 associated with the turbine-generator assembly.

FIG. 1 diagrammatically illustrates one of the operational units at the beginning of an operational cycle. It will be observed therefore, that a predetermined body of water 46 is disposed within the reservoir of side 16 above the level of the turbine 40 to which the reservoir is connected. The piston slab assembly 36 associated with side 16 is at the upper end of its stroke and begins its downstroke movement under its weight and the supplemental force exerted thereon by the power operated devices 38 as diagrammatically illustrated in FIG. 1. These power operated devices may be two-way hydraulic cylinder mechanism to which fluid is supplied under pressure by a motor operated pump 48 through a reversing valve mechanism 50. Although a single power operated device 38 is diagrammatically illustrated in Fig. 1, it will be appreciated that such illustration represents a plurality of devices arranged as illustrated in FIG. 6 and 7. Also associated with the piston slab 36, is a vent hatch valve mechanism 52 which is closed at the beginning of the downstroke of the piston slab assembly. Thus, the piston slab assembly during its downstroke will displace the body of water 46 through the turbine 40 into the reservoir on the other side 18 of the turbine. The piston slab associated with the side 18 is therefore displaced upwardly at substantially the same rate of movement as the piston slab assembly moving downwardly in side 16, under control of the other set of power operated devices 38 with which side 18 is associated. The vent valve mechanism associated with the upwardly moving piston slab as diagrammatically illustrated in FIG. 1, is open so as to vent any space that may develop between the bottom of the piston slab and the water entering and filling the reservoir associated with side 18. It will be apparent therefore, that the water flowing through the turbine 40 from side 16 to side 18 produces a rotational output which is transmitted by the drive assembly 42 to the generator 44. The drive assembly in one form of the invention includes two power paths 54 and 56 as diagrammatically shown. A hydrodynamic clutch 58 and brake 60 is disposed in each power path so as to control operation of the turbine and the transmittal of power therefrom in the proper direction to the generator 44. During the downstroke of the piston slab associated with side 16, the hydrodynamic clutch 58 associated with path 54 is engaged while the brake 60 is disengaged. The clutch associated with path 56 on the other hand is disengaged so that only the power path 54 is operative. Mechanical power is accordingly transmitted to the generator 44 in the proper direction, during the operational phases as illustrated in FIGS. 1 and 2 wherein the power path 54 is active and the power path 56 is inactive. Also, it will be noted from FIG. 2 that since the piston slab on the side 18 is moving upwardly at a higher speed than the rising water, a space 62 develops between the upwardly moving piston slab and the water entering the reservior on side 18. The space 62 is vented through the open hatch valve mechanism 52. Because of this arrangement, a proper water pressure differential is established between the inlet and outlet ends of the turbine 40. Also, by regulating the movement of the piston slabs, a relatively constant flow of water is effected through the turbine for generating power. As diagrammatically shown in FIG. 3, no power is transmitted from the turbine to the generator at the end of the downstroke of the piston slab associated with side 16. During this operational phase, both clutches 58 are disengaged and the brakes 60 engaged to stop rotation of the turbine. Also, after the water level in side 18 has reached the piston slab, the hatch valve mechanism is closed. Thus, the operating unit is conditioned for reversal of flow of water through the turbine 40 during the second half of the operational cycle as illustrated in FIG. 4. During the second half of the operational cycle, the power path 56 is activated by engagement of the hydrodynamic clutch 58 associated therewith, both brakes 60 being disengaged. Rotational power is accordingly applied to the generator 44 from the turbine 40 in the same direction even though water flows in a reverse direction from the reservoir of side 18 to the reservoir of side 16. In order to maintain the generator rotating without any appreciable loss in speed during the temporary interruption in the operation of the turbine 40, a fly wheel device 64 is provided.

It will be appreciated, that proper operation of the power plant will require timed sequential control over the motor operated pumps 48 associated with the power operated devices 38, the vent hatch valve mechanism 52 and the hydrodynamic clutches and brakes in the drive assembly 42 as well as facilities for monitoring movement of the piston slabs 36 in relation to each other and in relation to the body of water being displaced between the reservoirs through the turbine. Toward this end, automatic as well as manual controls and indicator devices are provided at the central control station 12 as will be hereinafter described in detail.

RESERVOIR CONSTRUCTION AND ARRANGEMENT

As shown in FIGS. 6 and 7, the vertical walls 22, 24, 26 and 28 are braced by concrete pilasters 66 and are provided with top walk ledges 68. Corner platforms 70 supported by I-beam braces 72 may be provided for purposes to be hereafter explained. In the form of the invention illustrated, the inside surface 74 of each wall is perfectly vertical as more clearly seen in FIG. 8 and is provided with a stop ledge 76 spaced above the bottom slab 78 of the reservoir as more clearly seen in FIG. 25. It will be apparent therefore from FIG. 25, that the stop ledge 76 will limit downward movement of the piston slab 36 to a position above the turbine 40 supported substantially on the bottom slab level. As more clearly seen in FIG. 13, each of the vertical walls is of a reinforced concrete construction and consists of two or more sections interconnected by an expansion joint generally referred to by reference numeral 80. The abutting sections have interfitted projecting portions 82 into which reinforcing rods 84 extend. Individual reinforcing rods however, do not extend between the sections. While the sides of the interfitted projections 82 are relatively slidable, the abutting portions are spaced apart by thermal expansion strips 86 which may be made of an asphalt impregnated fiber material. Also extending between the sections through the thermal expansion strip 86, are water sealing elements 88 that extend the entire vertical height of the reservoir walls. The opposite ends of these water sealing elements are provided with bulbous formations embedded within the concrete sections joined thereby. Caulking compound 92 completes the joint on the outside surface of the wall sections while the interior surface of the wall sections are provided with a smooth coating 94, presenting a suitable surface for wiping engagement with the piston slab 36. The joint 80 therefore accommodates thermal expansion of the materials from which the reservoir walls are made in order to avoid cracking and leakage of water. The joint is also waterproof so as to effectively retain a relatively large body of water within the reservoir. For similar reasons, the floor slab 78 of the reservoir is made in sections as more clearly seen in FIG. 14, the sections being interconnected by an expansion sealing joint 96. The joint 96 extends through the thickened portions 98 of the floor slab and includes a thermal expansion strip 100 spacing the abutting ends of the sections through which the sealing elements 102 extend. The expansion strips 100 and sealing elements 102 are respectively similar to the expansion strip 86 and sealing elements 88 hereinbefore described in connection with the joint 80. The joint 96 is caulked on the upper surface with an asphalt material 104.

As hereinbefore indicated, the reservoirs associated with the sides 16 and 18 in each operational unit are similar in construction. As shown in FIG. 25, the vertical walls are supported on suitable concrete footings 106 on either axial side of the turbine 40 through which the sides 16 and 18 are interconnected. The vertical walls between adjacent operational units may be formed as an interconnected wall assembly having a top connecting wall portion 108 as more clearly seen in FIG. 23. The control station 12 may be supported by posts 110 on the top wall portion 108.

PISTON SLAB ASSEMBLY

Each of the piston slab assemblies 36 is made of a reinforced concrete construction forming a dimensionally large and massive slab the sections of which are interconnected by an expansion sealing joint 112 as more clearly seen in FIG. 15. A thermal expansion strip 114 spaces the abutting ends of the slab sections within the joint 112 while a plurality of sealing elements 116 extend through the strip 114. An elastic caulking material 118 completes the seam between the slab sections on both the upper and lower surfaces of the slab. A metal plate 120 is secured to the slab sections bridging the joint on the underside of the piston slab.

In view of the dimensional extent and massiveness of the piston slab, it is necessary to prevent bending thereof during movement. Toward this end, a plurality of parallel spaced truss assemblies 122 are anchored to the top of each slab extending between the opposite sides of the slab adjacent to the vertical walls 22 and 26 of the reservoir. Connecting truss assemblies 124 extend perpendicular to the truss assemblies 122 in spaced adjacency to the sides of the slab adjacent the walls 22 and 26. As more clearly seen in FIGS. 10 and 11, the truss assemblies 122 include I-beam base members 126 that are embedded within the concrete slab. The end of each truss assembly 122 is welded to a gusset plate 128 as shown in FIG. 11 secured to the web of an I-beam 130 embedded within the concrete slab adjacent to a sealing assembly 132 peripherally mounted by the slab for wiping engagement with the inside surfaces of the vertical reservoir walls. The ends of the truss assemblies 124 are secured to plates 134 as more clearly seen in FIG. 12, the plate 134 extending upwardly from the embedded I-beam 137. The base beam 136 of each truss assembly 124 is also supported in spaced relation above the top of the concrete slab by a pair of slab embedded supporting members 138. Thus, bending of the slab in two perpendicular directions is resisted.

With reference to the lower portion of FIG. 34, the sealing assembly 132 which extends along each side of the piston slab includes a metallic channel member 140 having spaced legs through which pairs of embedded rod members 142 extend welded to the I-beams embedded in the slab. Top metallic surface plates 146 are bolted to the web portion 144 of the channel member 140 while bottom surface plates 147 are welded to the channel legs. The plates 146 and 147 project into close spaced adjacency to the internal surface of the reservoir wall. Curved end portions 148 are formed on the projecting ends of the plates 146 and 147 substantially bridging the gap which extends between the outside channel leg and a plurality of metallic retainers 150 interconnected with this channel leg by a plurality of compression springs 152. Each container 150 mounts a rubber type sealer 154. Accordingly, the sealers held by the retainer 150 are guided by the plates 146 and 147 for movement into engagement with the internal surface of the reservoir wall under the bias of the springs 152. The plates 146 and 147 are provided in order to limit leakage of water between the retainers 150 and the channel member 140 as water is being displaced by the slab assembly during its downward movement. The sealers 152 of course prevent leakage of water along the internal surface of the reservoir walls during such downward movement of the slab assembly.

SLAB ELEVATING AND LOWERING MECHANISM

In one form of the invention, the piston slab assembly 36 is downwardly displaced or upwardly displaced by power operated devices 38 of the two-way hydraulic cylinder type. As shown in FIGS. 8 and 9, each power operated devices 38 includes two cylinder members 156 interconnected at their upper ends by a cylinder head assembly 158. The lower ends of the cylinders 156 are disposed between a pair of I-beams 160 projecting from the reservoir wall adjacent to which the power operated device is mounted such as the wall 26 shown in FIGS. 8 and 9. A pair of I-beams 162 extend upwardly from the reservoir wall above the top ledge 68 in close parallel spaced relation to the cylinders 156. The head 158 of the cylinders is secured to the I-beams 162 by a pair of short I-beams sections 164 which a pair of braces 166 are interconnected between the I-beam sections 164 and the vertical I-beam posts 162 between the plates 168 and 170. Also, a cylinder tie band 172 embraces the cylinders 156 intermediate the upper and lower ends thereof. The cylinders slidably mount extensible piston rods with the lowermost piston rod members 174 being connected to the piston slab assembly 36 by means of the slab anchor plate 176 to which both piston rods 174 are connected. As shown in FIGS. 10 and 11, these anchor plates 176 may be secured by means of the tension bolts 178 to the slab assembly above a portion of the peripheral sealing assembly 132 which wipingly engages the walls 22 and 26 of the reservoir. Thus, a plurality of aligned power operated devices 38 on opposite sides of the piston slab assembly will exert a resultant force supplementing the weight of the slab assembly itself to cause downward movement of the piston slab assembly at a predetermined rate of movement to a position just above the stop ledge 76 as shown by dotted line in FIG. 8. Downward movement of the piston slab assembly will of course displace the water through the turbine assembly under the proper pressure and velocity. For upstroke movement the power operated cylinder devices exert an upwardly directed force necessary to overcome the weight of the piston slab assembly and move the slab at a rate of movement slightly greater than the rise of water so that there will be no opposition to the displacement of the water by the other piston slab assembly during its downstroke movement. It will be appreciated therefore, that the hydraulic power operated devices respectively associated with the piston slab assemblies for each operating unit, must be properly synchronized. Also, in utilizing the two cylinder, two-way hydraulic type of power operated devices, the interior surface 74 of the reservoir walls 22 and 26 should be perfectly vertical.

As shown in FIGS. 27 and 30, the power operated devices 38 hereinbefore described are replaced by a plurality of one-way hydraulic cylinder devices 180 arranged to exert a downward force on the piston slab assembly 36 in order to effect its downstroke movement. The power operated cylinder devices 180 are similar in construction and mounting to the power operated devices 38 hereinbefore described except that they are powered for displacement of the piston slab assembly in a downward direction only. Upward force is applied to the piston slab assembly on the other hand through a plurality of cables 182 respectively wound open a plurality of cable winding drums 184 supported on an elongated power shaft 186. The power shaft is rotatably journalled on the top ledge 68' of the reservoir walls 22' and 26' by a plurality of spaced bearing assemblies 188. The power shaft is driven by means of a high starting, reversible torque electric motor 190 through a four-speed, quick-change hydraulic and mechanical transmission 192. The transmission is arranged to rotate the power shaft 186 at the proper speed and with sufficient rotational torque to elevate the piston slab assembly through the cables 182 at the proper speed during upstroke movement of the piston slab assembly. A brake mechanism is associated with the transmission 192 in order to regulate upward movement and to hold the piston slab at any stop position desired under control of the operator at the central control station. Further, the motor 190 is reversible for use in an emergency situation in order to restore synchronization between the movements of the two piston slab assemblies associated with the operating unit of the power plant.

Referring now to FIGS. 35, 36 and 37, it will be observed that each of the cable winding drums 184 is provided with a spiral, cable receiving groove 194. Each cable 182 is anchored to one axial end of each cable winding drum 184 by a clamping collar assembly 196. Thus, in response to rotation of the power shaft 186 in one direction, the cables will be wound upon the cable drums. In view of the length of the cable in relation to the axial length of the cable drum, more than one layer of cable will be wound on each drum causing a change in the radial spacing of the cable from the rotational center of the cable drum. In view thereof, the interior surface of the reservoir walls 22' and 26' are slightly inclined in the proper direction to avoid interference between the cable and the wall. Also, cable retainers 198 are secured between the bearing assemblies 188 in front of the cable drums 184 in order to confine the cables to the drum. The bearing assemblies 188 as shown in FIGS. 35 and 36, are firmly secured in place on the top ledges 68' of the reservoir walls by means of the support brackets 200.

Referring now to FIG. 34, it will be observed that each cable 182 is secured at its lower end to the piston slab assembly 36 by means of an adjustable cable clamp unit 202. Each cable clamp unit includes an elongated clamp member 204 which is split on one side at 206. A plurality of clamping bolts 208 extend through the split flange portions 206 in order to cause the clamp member 204 to firmly embrace a length of cable. Also, a clamp collar 210 is secured to the cable within an opening 212 formed in the lower body portion 214 of the clamp member receiving an externally threaded stud 216. The stud 216 is locked to the head portion 214 of the clamp member in an axially adjusted position by the setscrews 218. The lower end of the stud 216 is threadedly received within a turnbuckle member 220 which also threadedly receives an externally threaded stud 222 anchored to the piston slab assembly. The lower end portion of the stud 222 is accordingly threadedly received within an anchor nut 224 to which it is welded, the nut 224 being embedded within the concrete slab member between the plates 140 and 144 of the sealing assembly 132.

VENT HATCH VALVE MECHANISM

It will be appreciated that the top of each of the piston slab assemblies is provided with a surface slightly inclined downwardly toward the center so that water will drain at a low point on the top surface into the reservoir through a suitable drain opening associated with the vent hatch valve mechanism 52. Pairs of hatch valve mechanisms may accordingly be aligned in positions such as illustrated in FIG. 6 on either side of the center line of the piston slab assembly. Relief valve mechanisms 226 may also be provided in order to relieve any excessive pressure developed within the reservoir during downstroke movement of the piston slab assembly.

Each pair of hatch valve mechanisms 52 as more clearly seen in FIGS. 17, 18 and 19, are operated by a pair of endless sprocket chains 228 entrained about sprocket wheels connected to an idler shaft assembly 230 and a drive shaft assembly 232 rotatably mounted on top of the piston slab adjacent opposite ends of the pair of hatch valve mechanisms. The drive shaft assembly 232 is drivingly connected through a sprocket drive 234 to a speed reducer and clutch unit 236 which in turn is driven by a reversible electric motor 238 of the high torque starting type through a belt drive 240.

Associated with each hatch valve mechanism, is an opening 242 formed in the slab and bounded on opposite sides by raised portions 244 as shown in FIG. 18. The opening 244 is adapted to be closed by a hatch plate member 246. Angle frame members 248 adjacent the periphery of the hatch plate member as well as angle cross frame members 250 are welded to the hatch plate member. Projecting upwardly from the angle frame members 248 and 250, are connectors 252 which are pivotally connected to the sprocket chains 228. Attached as by welding to the underside of the hatch plate member 246, at opposite longitudinal ends, are retainers 254 from which rubber sealers 256 project into wiping engagement with the raised portions 244 when the hatch plate member is in a closed position as illustrated in FIG. 18. The opening 244 is thereby sealed. Secured to the hatch plate member 246 on three sides, is a rubber seal member 258 as shown in FIGS. 18 and 19. The seal member 258 thus yieldably guides longitudinal movement of the hatch plate member by the sprocket chains 228 from the closed position to the open position. Toward this end, elongated guide strips 260 are closely spaced from three sides of the opening 244 and extends therebeyond as shown in FIG. 17 in order to guide movement of the hatch plate member to the open position. The guide strips 260 are anchored to the concrete slab member by anchoring bolts 262. The anchoring bolts extend through a channel member 264 which spaces the guide strips 260 above the top surface of the concrete slab member to form with the guide strips 260 a guide assembly in wiping engagement with the seal members 258.

TURBINE GENERATOR ASSEMBLY

As more clearly seen in FIG. 27, the reservoirs associated with sides 16 and 18 of an operational unit are interconnected by a tubular conduit member 266 formed from separable semicylindrical sections and coaxially aligned between circular openings formed in the adjacent reservoir walls through the arcuate concrete projections 268. Concrete footings 270 support the tubular conduit member 266 between the adjacent reservoir walls. Further, structural brace assemblies 272 as shown in FIG. 28 are secured as by welding to the separable half sections of the tubular conduit member 266 in alignment with the footings 270 to which they are secured on either side of the tubular conduit member for firm support and removal of the tubular half sections when repair of the turbine assembly is necessary. The tubular conduit member 266 is also provided with opposite axial flanges 274 by means of which the tubular sections are secured to the concrete wall projections 268. A plurality of fasteners 276 therefore secure the flanges 274 to the concrete projections. As more clearly seen in FIG. 29, the fasteners extend from the flange 274 through a rubber gasket 278 and are threadedly mounted within a nut 280 welded to a concrete embedded hoop 282 for anchoring the flange to the concrete projection 268 within which the circular opening is formed. In order to install or remove the turbine for repair purposes, a slot 284 is formed in the concrete projection 268 as shown in FIGS. 32 and 33. The slot is closed by a removable plate 286 clamped in place within a water sealed recess by the bolts 288. A jack mechanism 290 is placed within the slot 284 in order to prevent collapse of the concrete section 268. Mounted within the circular opening formed in the reservoir walls, are a plurality of equiangularly spaced supporting struts 292. Each strut has a dimensionally enlarged radially outer end secured to the interior of the concrete projection 268 along substantially the entire axial length thereof. As more clearly seen in FIGS. 31 and 33, a metallic wedge 294 is disposed between the outer flange 296 of the strut and the bottom of the recess within which it is received in the concrete projection 268. A plurality of fasteners 298 secure the strut flange to the concrete projection. The dimensionally smaller, radially inner ends of the struts support a streamlined shaped gear casing 300 as shown in FIGS. 25 and 27. The gear casing 300 is furthermore supported in coaxial relation to the tubular conduit 266 by means of an anchor rod 302 secured by the anchor plate 304 to the reservoir wall at a lower end. The anchor rod 302 thus extends at a downward incline from the casing 300 into the reservoir and is protectively enclosed by a tubular housing 306 secured at opposite ends to the anchor plate 304 and the gear casing 300. The upper end of the anchor rod 302 is secured to and supports a bearing assembly 308 with the bear casing 300. The bearing assembly rotatably supports one end of a turbine rotor shaft 310 which extends from the gear casing 300 into and through the tubular conduit 266.

A turbine rotor 312 is supported for rotation on the turbine shaft 310 and includes a tubular hub portion 314 secured to the shaft 310 at a plurality of axially spaced locations. As shown in FIGS. 25 and 26 for example, the tubular hub 314 is welded to internal webs 316 to which hexagon coupling collars 318 are welded. A plurality of setscrews 320 on either side of each web 316 extend from the flat faces of the collar 318 into engagement with the turbine shaft 310 in order to substantially anchor the turbine shaft to the turbine rotor assembly 312. Turbine blades 322 of suitable curvature are interconnected between the rotor hub 314 and the turbine casing 324 to complete the rotor assembly.

The turbine assembly 40 hereinbefore described accommodates flow of water through the tubular conduit 266 in opposite directions producing rotation of the turbine shaft 310 in opposite directions because of the reversal of flow. Input torque is accordingly transmitted in both directions from the turbine shaft to the generator 44 through the torque transmitting drive assembly 42 producing rotation of the generator in one direction. The drive assembly 42 is supported on the adjacent reservoir walls above the tubular conduit 266 as shown in FIG. 27 below the I-beams 326 which space the reservoir wall from each other. Cross beams 328 are interconnected between the wall spacing I-beams 326 to support thereabove the electric generator 44. An input shaft 330 extends downwardly from the generator into the drive assembly 42. The input shaft 330 is driven through bevel gear 332 enmeshed with bevel gear 334 connected to a drive shaft 336. The opposite ends of the drive shaft 336 are connected to bevel gears 338 enmeshed with bevel gears 340 overlying opposite axial ends of the turbine assembly 40 adjacent the reservoir walls. The bevel gears 340 are therefore connected to downwardly extending gear shafts 342 which are axially aligned with the turbine output shafts 344. As more clearly seen in FIG. 25, each shaft 344 extends through a packing gland 346 in the concrete extension 268 into and through a tubular housing 348 which extends radially between the concrete extension 268 and the gear casing 300. The lower end of the shaft 334 is connected to a bevel gear 350 within the gear casing which is enmeshed with the bevel gear 352 secured to the turbine shaft 310. Thus, the shafts 334 are driven in opposite directions by the turbine assembly in order to transmit drive in one direction to the drive shaft 336. Toward this end, each shaft 344 is drivingly coupled to its associated gear shaft 342 by means of the hydrodynamic clutch mechanism 58 as shown in FIG. 27. The brake mechanism 60 is also engageable with the shaft 344 in order to stop rotation of the turbine while power is interrupted by disengagement of the clutch mechanism 58 during a short interval prior to reversal of flow through the tubular conduit 266. It will be apparent therefore, that engagement and disengagement of the clutch and brake mechanisms must be properly synchronized. Since the bevel gear 340 may drive the shaft 336 in opposite directions, drive is taken off one axial end of the turbine when it is being driven in one direction by flow of water therethrough, drive being taken from the other axial end of the turbine when its rotation is reversed during the second half of the operational cycle. For example, during the power downstroke of the piston slab assembly 36 associated with the side 16 of the operational unit, the left hand clutch mechanism 58 is engaged so drive may be transmitted in one direction to the drive shaft 336 from the left end of the turbine assembly. During upstroke of the piston slab assembly associated with the side 16, the left hand clutch mechanism 58 is disengaged while the right hand clutch mechanism is engaged so that the shaft 336 will be driven in the same direction by reverse rotation of the turbine assembly as water is being displaced in the reverse direction therethrough during downward movement of the piston slab assembly associated with side 18. During the short pause between the two halves of the operational cycle, both clutches are disengaged and both brake mechanisms engaged in order to stop rotation of the turbine rotor 312 before its rotation is reversed. While drive to the generator is interrupted, the shaft 336 and the input shaft 330 to the generator may be maintained rotating by the fly wheels 64 without any appreciable reduction in speed.

Referring now to FIGS. 41 and 42, another form of turbine assembly is illustrated generally referred to by reference numeral 360. In this form of the invention, a pair of tubular conduits 362 and 364 interconnect the adjacent reservoirs. The conduit 362 is therefore secured in coaxial relation between an inlet opening 366 and an outlet opening 368 in the reservoir walls while the tubular conduit 364 is interconnected in coaxial relation between the inlet opening 370 and outlet opening 372. It will be observed therefore, that each reservoir wall is provided with adjacent inlet and outlet openings. Radially extending, supporting struts 374 similar in construction and mounting to the supporting struts 292 hereinbefore described, positions journal supports 376 for the turbine rotors within the outlet openings 368 and 372. Gear casings 378 on the other hand into which the turbine shafts extend, are supported within the inlet openings 366 and 370. Also, each of the outlet openings 368 and 370 is adapted to be closed by hinged, one-way gate assemblies 380. Thus, as shown in FIG. 42, the gates 380 open when water is conducted from the inlet opening 360 in one direction through the turbine assembly for discharge from the outlet opening 368. When water is displaced in the opposite direction, the gates associated with outlet 368 close under the velocity pressure of the water itself so that flow can only proceed through the inlet opening 370 and be discharged through the outlet opening 372 past the gates 380 associated with the outlet opening 372. It will be appreciated therefore, that a reversal of flow between the adjacent reservoirs of an operational unit requires no brake mechanism in this form of the invention. Only a disengageable clutch mechanism 382 as shown by dotted lines in FIG. 41 is required for each of the two turbines associated with the tubular conduit 362 and 364. These turbines operate in reverse rotational directions in order to drive the generator 44 during both halves of the operational cycle. Operation of this form of the invention is similar to that hereinbefore described except for the brake mechanisms which are eliminated, and the operational control changes incident thereto, including elimination of the pause in power transmission associated with the braking action hereinbefore described.

OPERATIONAL INDICATORS

In order to monitor operation of each operational unit, it is necessary to measure the instantaneous position of the piston slabs. A height measuring mechanism 384 is therefore provided for this purpose as shown in FIGS. 20, 21 and 22. The level measuring device 384 is mounted on the external surface of a reservoir well in an appropriate location and includes a tubular guide member 386 fixed to the exterior surface of the wall within which a vertically movable carriage 388 is slidably mounted. The carriage is connected to one end of a cable 390 which is entrained about a pair of pulley wheels 392 and 394 rotatably mounted on top of the reservoir wall adjacent the exterior and interior sides thereof. The cable extends downwardly on the interior side of the wall and is anchored to the top of the piston slab in any suitable manner. Accordingly, the vertical position of the carriage 388 will reflect the vertical position of the piston slab with which it is associated. Mounted within the tubular guide 386, is a contact strip 396 mounting a plurality of equal vertically spaced contact members 398. The carriage member 388 mounts a contact closing member 400 so that position indicating signals will be produced by engagement of the contact members 398 for each incremental displacement of the piston slab assembly. Suitable wiring is accordingly connected through the contact strip 396 to the contact members 398 for transmitting the indicating signals to the control station.

It is also essential in order to properly monitor operation of the power plant, that the vertical spacing between the water in the reservoir and the piston slab assembly be measured particularly during its upstroke movement. An air depth indicator 402 is provided for this purpose as more clearly seen in FIG. 24. The indicator 402 includes a float member 404 supported on the body of water 46 within the reservoir by buoyant forces while enclosed within a recess 406 formed in the piston slab assembly. A tubular shaft 408 is connected to the float member and extends upwardly with a sliding fit through a tubular sealer 410 extending through the slab assembly. The tubular sealer 410 is held in position by a base 412 overlying its flange portion 414. Supported on the base above the slab assembly, is a tubular housing 416 within which the tubular shaft 408 is guided for vertical movement by the tubular guide 418. The tubular guide is provided with a slot through which a switch contact actuating member 420 projects from the rod 408. The contact mounting assembly 422 is fixedly mounted within the housing 416 in operative relation to the shaft 408 so that signals will be produced in response to incremental displacement of the rod 408 relative to the slab assembly 36. Suitable wiring therefore extends from the indicator 402 for transmission of these signals to the control station reflecting displacement of the float member 404 relative to the concrete slab resulting from any spacing that develops between the bottom of the piston slab assembly and the level of the body of water 46 within the reservoir. A water depth indicator 402' shown in FIG. 6, similar in construction and operation to indicator 402 is also mounted on top of the slab to gauge the depth of any water on top of the slab.

As hereinbefore indicated, the power operated devices such as the two-way hydraulic cylinder devices 38 are connected to opposite sides of the piston slab assembly 36 for displacement thereof. Particularly during upward movement of the piston slab assembly, there may be some bending of the slab causing it to deviate from a horizontal plane. In order to monitor and correct this situation and thereby restore the slab assembly to a planar condition, a radiant energy emitting device or transmitter 424 is mounted adjacent one side of the slab assembly as more clearly seen in FIG. 16. The energy radiated by the transmitter 424 may be either of the radio-frequency type or may be a laser beam. A receiving unit 426 is mounted adjacent the opposite side of the piston slab assembly. The receiver is adapted to detect the presence of a beam radiated from the transmitter 424 when the piston slab is in a planar condition. Any excessive deviation of one side of the piston slab assembly relative to the other side reflecting excessive bending of the slab assembly, will accordingly produce a signal as detected through the radiant energy beam. Corrective changes in the displacing forces applied to the slab assembly by the power operated devices on one side thereof will restore the slab assembly to its proper level condition as detected by the level sensing arrangement described.

CONTROLS

As will be appreciated from the foregoing description, the electric motors which operate the pumps for the power operated slab displacing devices 38, the hatch motors which operate the vent valve mechanisms 52, and the clutch and brake mechanisms must be controlled in accordance with a predetermined sequence in order to obtain proper operation of each power operating unit of the power plant. Thus, the electric motors diagrammatically indicated by reference numeral 428 in FIG. 39 must be controllably regulated on one side 16 of the operational unit in proper relation to the regulation of corresponding electric motors on the other side 18. Accordingly, energization of the motors 428 for both downstroke and upstroke operation is timed by timers 430 and 432 through motor control components 434 associated with each side of the operational unit in order to automatically control the operational sequence. The motor control components 434 are interconnected by an interlock mechanism 436 in order to maintain proper synchronization in the control and regulation over the motors 428 as well as the hatch motors 238 through which the piston slabs are controllably vented. A timing relay component 438 is also operationally interconnected with the motor control components 434 in order to time operation of the hatch motors 238 and the controls 440 for the clutch and brake mechanisms. Thus, the motors 428 are energized at the proper speed and in the proper direction for effecting movement of the piston slabs during downstroke and upstroke phases as determined by the timers 430 and 432. The hatch motors 238 on the other hand are operated at the proper time through the timing relays to open and close the appropriate venting valve mechanism 52 during a short pause at the ends of the piston slab strokes. The clutch and brake mechanisms are also engaged and disengaged at the proper times in connection with the single turbine type of turbine assembly 40 hereinbefore described in order to effect drive from the proper end of the turbine assembly and temporarily interrupt drive just before there is a reversal in flow through the turbine assembly at the end of a power stroke before the beginning of the next power stroke. While the operational sequence is automatically controlled, manual controls 442 are provided as diagrammatically shown in FIG. 39 in order to over-rule the automatic motor controls should the monitoring facilities indicate either malfunction or a need to correct certain deviations from normal operation.

FIG. 40 shows a typical timing chart for automatic operation of one operational unit employing the single turbine drive arrangement. With reference to the diagrammatic illustrations in FIGS. 1 through 4, it will be observed from the timing chart that at the beginning of the cycle with the piston slab of side A beginning its downstroke movement and side B beginning it upstroke movement, the hatch valve 52 of side B is opened, the brake mechanisms 60 on both sides are disengaged, the clutch 58 of side A is engaged and the clutch of side B is disengaged. The piston slab of side B moves up at a greater rate than the level of water rising within its reservoir until the piston slab motors associated with side B are deenergized. At this instant, the hatch motor is energized to begin closing of its vent valve mechanism 52. In this manner, the flow of water through the turbine assembly is maintained substantially constant until the slab of side A approaches the end of its downstroke. At the end of the downstroke movement, after 68 seconds as indicated on the timing chart, the turbine brakes on sides A and B are engaged just after the engaged clutch of side A is disengaged. During a transitional period after elapse of 76 seconds from the beginning of a cycle, the vent hatch 52 is completely closed on side B and rotation of the turbine assembly brought to a stand still.

At the beginning of the next half of the cycle, the piston slab on side A begins its upstroke movement while the piston slab on side B begins its downstroke movement by energization of the piston slab motors. The hatch valve motor on side A is energized to begin opening of the vent valve while the brakes associated with sides A and B are disengaged and held disengaged for the next half of the cycle as shown on the timing chart. At the same time, the clutch mechanism of side B is engaged while the clutch mechanism of side A is held disengaged during the next half of the operational cycle. A full operational cycle is completed after 144 seconds as indicated on the timing chart followed by another transitional period. During the transitional period, the vent valve of side A is completely closed and both brake mechanisms are again engaged. Both clutches on the other hand are held disengaged during this transitional period. The next cycle begins 152 seconds after the beginning of the previous cycle with disengagement or both brakes.

Operation of the various components associated with each operational unit may be manually controlled and monitored through a control panel 444 illustrated in FIG. 38 which is applicable to the single turbine type of operational unit hereinbefore described. The side of the control panel corresponding to side A for example of the operational unit is shown in its entirety, this side being of course repeated on the other side partially shown in FIG. 38. Since a single generator 44 and turbine 40 are associated with the operational unit, generator and turbine speedometers 446 and 448 are centrally mounted on the control panel. The proper generator and turbine speed are signified on the speedometers by illuminated marks 450 and 452. Mounted on top of the panel above the generator speedometer 446, are the master switches including the "on" switch 454 and the "off" switch 456 through which the load is applied to the output of the power plant or cut off. When the power plant is applying energy to a load, a green indicator lamp 458 mounted adjacent the "on" switch is accordingly illuminated while a red lamp 460 disposed adjacent the "off" switch is illuminated when the load is cut off.

On either side of the center line of the control panel below the turbine speedometer 448, are mounted manual turbine brake controls 462 respectively associated with the turbine brake on either side of the turbine assembly 40. With the controls 462 in the "off" position illustrated, the green indicator lamps 464 are illuminated to signify this condition. When the controls are displaced downwardly in order to apply the brakes, one or both of the red lamps 466 are illuminated. The power operated turbine brakes 60 may also be applied or disengaged through the push button switches 468 and 470. Indicator lamps 472 and 474 respectively signify actuation of the "on" switch 468 and the "off" switch 470. Similarly, the clutch mechanisms 58 on either side of the operational unit are disengaged or engaged through the push button switches 476 and 478. The neutral or engaged condition of the clutch mechanisms are respectively indicated by the red and green lamp indicators 480 and 482.

Slab height indicators 484 are mounted on either side of the speedometers 446 and 448 in order to signify the instantaneous positions of the piston slabs. Below each of the slab height indicators, are speed indicating devices 486 and 488 respectively indicating the speed of the piston slab during its downstroke movement and during its upstroke movement. Illuminated marks 490 and 492 show the proper descending and ascending speeds. When decending, a green indicator lamp 494 is illuminated while an amber lamp 496 is illuminated during ascending movement. The slab position indications on the slab height indicators 484 and the rate of descent or ascent on the speed indicators 486 and 488 are of course obtained through signals derived from the slab position measuring devices 384 illustrated in FIGS. 20, 21 and 22. The air depth measuring device 402 described in connection with FIG. 24 on the other hand furnishes signals producing an indication on the air depth indicator 498 shown on the control panel 444 in FIG. 38. The signals derived from the water depth measuring device 402' are fed to the indicator 500 so that the operators may monitor the amount of water above the slab as it is descending.

When the slab level sensing transmitter and receiver are operating as depicted in FIG. 16, the green indicator lamp 502 on the control panel is illuminated. Excessive deviation upwardly or downwardly of one side of the slab relative to the other side will be indicated by illumination of one of the red indicator lamps 504 and 506 of the weight levelling indicator. When the slab is in proper condition on the other hand, the green lamp 508 is illuminated. In order to correct any malfunction or abnormal condition of the piston slab as signified by the weight leveling indicator, the pump motors controlling the hydraulic power devices 38 on either side of the piston slab may be increased or decreased in speed through the pump motor controls 510 and 512. It will be appreciated, that separate pump motors are provided for each side of the piston slab in order to operate the plurality of power operated devices on each side. A plurality of indicators 512 are accordingly provided on the control panel for each of the power operated devices so that when any one of these power operated devices is malfunctioning, the location of the malfunction will be displayed. The indicator lamps 512 are disposed between the manual motor controls for the pump motors on each side of the piston slab. Two sets of push button controls are therefore provided for each slab side for reversible control of the pump motors in order to effect movement in an upward direction or a downward direction. Downward movement on the left side for example is effected by actuation of the push button switch 514 accompanied by illumination of the green indicator lamp 516. Downward movement may then be interrupted by actuation of the "off" push button switch 518 accompanied by illumination of the red indicator lamp 520.

Push button switches 522 and 524 are also provided on the control panel in order to respectively energize and deenergize the hatch valve motors 238 aforementioned. Indicator lamps 526 and 528 are respectively illuminated in order to indicate the condition of these hatch motors. The rotational direction of the drive to the hatch valve mechanisms through the transmission 236 on the other hand is determined through additional push button controls including a pair of pushbotton switches 530 and 532 through which the transmission is either placed in neutral or engaged in order to open the hatch valve mechanism upon energization of the hatch motor. Actuation of the push button switches 530 and 532 is signified by one of the amber lamps 534 and 536. When the hatch valve mechanism is fully opened, the red indicator lamp 538 is illuminated. Similar control over the hatch motor in a closing direction is effected through the push button switches 540 and 542. A green indicator lamp 544 is illuminated when the hatch valve mechanism is closed. Amber lamps 546 and 548 respectively indicate actuation of the push button switches 540 and 542. When either one of the pushbutton switches 532 and 542 is actuated to engage the transmission 236 there is a time delay before drive is transmitted to the hatch valve mechanism in order to permit stoppage of the motor and reenergization thereof.

SUMMARY

In order to condition the power plant for operation, the two reservoirs associated with the operational unit are filled to the proper level with water from the storage facility 30 after the piston slabs in both reservoirs are brought to a midposition through manual controls as indicated on the slab height indicators 484 of the control panel. The vent hatch valve mechanisms on both piston slabs are opened so that the water level may reach the piston slabs as indicated on the air depth indicator 498.

One of the piston slabs is then selected for downward movement and the other for upward movement under manual control with one of the clutches engaged in order to initiate rotation of the generator. When the end of the stroke is reached, the clutches are disengaged and an operational cycle begun with both clutches disengaged and remaining disengaged. The pump motors associated with the power operated devices are brought to the proper speed for obtaining the desired rate of movement of the piston slabs. When the speed of the turbine as indicated on its speedometer 448 reaches the proper value, the clutch mechanism associated with the downwardly moving piston slab is engaged. The automatic control system will then take over to complete the operational cycle. Automatic operation will then continue causing successive synchronized movement of the piston slabs through downstroke and upstroke phases of the cycle as well as short transitional periods during which movement of the venting hatch valve mechanism to either an open or closed position is completed and rotation of the turbine assembly stopped so that a reversal of flow therethrough may follow. Where a single turbine type of power plant is utilized in each of the operational units, stoppage of the turbine is effected through brake mechanisms. Where a dual turbine type of arrangement is utilized as depicted in FIGS. 41 and 42, the brake mechanisms may be eliminated. In either event, the clutch mechanisms associated with the descending piston slab is engaged while the clutch mechanism associated with the ascending piston slabs remains disengaged. Operation thus continues automatically until some malfunction occurs as monitored through the control panel. The operators may then execute corrective measures through the manual overriding controls.

The electrical energy supplied to the motors may be derived from an external source or may at times be obtained or supplemented from the output of the generator associated with the power plant. The particular structure described in connection with each operational unit makes it apparent that relatively large bodies of water may be displaced in order to effect the conversion of energy as described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for converting mechanical energy into electrical energy comprising at least two reservoirs at approximately the same level, a predetermined body of liquid displaceable between said reservoirs, turbine means interconnected with said reservoirs for establishing fluid communication therebetween, means for displacing said body of liquid from one of the reservoirs to the other in opposite directions through the turbine means, and a generator driven by the turbine means in response to flow of the liquid in the opposite directions through the turbine means.

2. The combination of claim 1 wherein said liquid displacing means includes a vertically movable slab, power operated means connected to the slab for lowering and elevating the same between vertically spaced positions above the turbine means, and vent means mounted by the slab for preventing development of suction pressure between the liquid and the slab during upward movement thereof.

3. Apparatus for converting mechanical energy into electrical energy comprising at least two reservoirs, a predetermined body of liquid displaceable between said reservoirs, turbine means interconnected with said reservoirs for establishing fluid communication therebetween, means for displacing said body of liquid from one of the reservoirs to the other through the turbine means, a generator driven by the turbine means in response to flow of said body of liquid through the turbine means, said liquid displacing means including a vertically movable slab, power operated means connected to the slab for lowering and elevating the same between vertically spaced positions above the turbine means, vent means mounted by the slab for preventing development of suction pressure between the liquid and the slab during upward movement thereof, said slab comprising a reinforced concrete member, truss means mounted on top of the concrete member for resisting bending thereof during displacement by the power operated means and sealing means peripherally mounted by the concrete member for yieldable engagement with the reservoir.

4. The combination of claim 3 wherein said turbine means includes conduit means interconnecting the reservoirs below a lowermost position of the liquid displacing means, a rotor having turbine blades rotatably mounted within said conduit means, and gear means drivingly connecting opposite axial ends of said rotor to the generator.

5. The combination of claim 4 including drive engaging means operatively connected to said gear means for interrupting drive between the turbine means and the generator as the liquid displacing means reaches said lowermost position.

6. The combination of claim 1 wherein said turbine means includes conduit means interconnecting the reservoirs below a lowermost position of the liquid displacing means in both of the reservoirs, a rotor having turbine blades rotatably mounted within said conduit means, and gear means drivingly connecting said rotor to the generator.

7. The combination of claim 6 including driven engaging means operatively connected to said gear means for interrupting drive between the turbine means and the generator as the liquid displacing means reaches said lowermost position.

8. The combination of claim 7 wherein said conduit means comprises a tubular housing having opposite axial end portions continuously open to the reservoirs, and support means connected to the housing within said end portions for rotatably mounting the rotor, said drive engaging means including a brake device for stopping rotation of the rotor permitting reversal of flow through the tubular housing.

9. The combination of claim 8 wherein said support means includes a gear casing enclosing the gear means, bearing means within the casing for journaling the rotor, an anchor rod connected to the bearing means and extending downwardly therefrom into the reservoir and supporting struts fixedly positioning the gear casing within one of said end portions of the tubular housing.

10. The combination of claim 1 wherein said turbine means includes a pair of conduits interconnecting the reservoirs below a lowermost position of the liquid displacing means, flow responsive gate means mounted by the conduits for limiting flow through each of said conduits in opposite directions relative to each other, a pair of bladed rotors mounted for rotation within said conduits, and gear means drivingly connecting said rotors to the generator.

11. The combination of claim 10 including drive engaging means operatively connected to said gear means for interrupting drive between the turbine means and the generator as the liquid displacing means reaches said lowermost position.

12. The combination of claim 11 wherein each of said conduits is continuously open at one axial end portion opposite the gate means, and support means connected to the conduit within each of said end portions for rotatably mounting the rotors.

13. The combination of claim 12 wherein said support means includes a gear casing enclosing the gear means, bearing means within the casing for journaling the rotor, an anchor rod connected to the bearing means and extending downwardly therefrom into the reservoir and supporting struts fixedly positioning the gear casing within one of said end portions of the tubular housing.

14. The combination of claim 1 including depth measuring means for indicating the instantaneous position of the liquid displacing means within the reservoir.

15. Apparatus for converting mechanical energy into electrical energy comprising at least two reservoirs, a predetermined body of liquid displaceable between said reservoirs, turbine means interconnected with said reservoirs for establishing fluid communication therebetween, means for displacing said body of liquid from one of the reservoirs to the other through the turbine means, and a generator driven by the turbine means in response to flow of said body of liquid through the turbine means, depth measuring means for indicating the instantaneous position of the liquid displacing means within the reservoir, said liquid displacing means including a vertically movable slab, power operated means connected to the slab for lowering and elevating the same between vertically spaced positions above the turbine means, and vent means mounted by the slab for preventing development of suction pressure between the liquid and the slab during upward movement thereof.

16. The combination of claim 15 including flat operated means mounted by the slab for measuring the level of liquid above and below the slab.

17. The combination of claim 16 including level sensing means mounted by the slab and operatively connected to the power operated means for indicating bending of the slab during movement thereof.

18. In combination with a turbine having an inlet, means for supplying fluid under pressure to the inlet to operate the turbine comprising a reservoir having vertical walls enclosing a body of liquid above said inlet, a reinforced concrete slab vertically moveable between said walls within the reservoir above the body of liquid, sealing means peripherally mounted by the slab for wiping engagement with said walls, a plurality of power-operated devices fixedly mounted by said walls adjacent opposite sides of said slab for upward and downward vertical movement thereof, truss means mounted by the slab and extending between said opposite sides thereof for resisting bending of the slab during said vertical movement, vent valve means mounted by the slab for atmospherically venting any space between the slab and said body of liquid during upward movement of the slab, and control means connected to the power operated devices for effecting upward movement of the slab more rapidly than the rise of liquid within the reservoir.

References Cited
UNITED STATES PATENTS

| | | | |
|---|---|---|---|
| 3,405,278 | 10/1968 | Ley | 290—52 |
| 3,372,645 | 3/1968 | Willi. | |
| 3,205,663 | 9/1965 | Kluge | 60—54.5 |
| 3,135,094 | 6/1964 | Kress | 60—54.5 |
| 2,246,472 | 6/1941 | Sharp | 290—52 |
| 1,494,008 | 5/1924 | Nagler | 290—52 |

GLEN SIMMONS, Primary Examiner

U.S. Cl. X.R.

60—54, 108; 290—1